US010904306B2

(12) United States Patent
Barvesten et al.

(10) Patent No.: US 10,904,306 B2
(45) Date of Patent: Jan. 26, 2021

(54) PERSONAL MEDIA STREAMING APPLIANCE SYSTEM

(71) Applicant: Spotify AB, Stockholm (SE)

(72) Inventors: Mats Barvesten, Karlskrona (SE);
Andreas Cedborg, Stockholm (SE);
Johan Oskarsson, Stockholm (SE)

(73) Assignee: Spotify AB, Stockholm (SE)

( * ) Notice: Subject to any disclaimer, the term of this patent is extended or adjusted under 35 U.S.C. 154(b) by 13 days.

(21) Appl. No.: 15/973,198

(22) Filed: May 7, 2018

(65) Prior Publication Data

US 2019/0342358 A1 Nov. 7, 2019

(51) Int. Cl.

| | |
|---|---|
| *G06F 3/048* | (2013.01) |
| *H04L 29/06* | (2006.01) |
| *G06F 3/0481* | (2013.01) |
| *G06F 3/16* | (2006.01) |
| *G10L 15/22* | (2006.01) |
| *G10L 25/78* | (2013.01) |
| *G06F 1/16* | (2006.01) |
| *H01R 13/62* | (2006.01) |
| *H02J 7/00* | (2006.01) |
| *H04W 84/04* | (2009.01) |
| *H04L 29/08* | (2006.01) |

(52) U.S. Cl.
CPC ............ *H04L 65/60* (2013.01); *G06F 1/1632* (2013.01); *G06F 3/0481* (2013.01); *G06F 3/167* (2013.01); *G10L 15/22* (2013.01); *G10L 25/78* (2013.01); *H01R 13/6205* (2013.01); *H02J 7/00* (2013.01); *G10L 2015/223* (2013.01); *H04L 67/306* (2013.01); *H04W 84/042* (2013.01)

(58) Field of Classification Search
None
See application file for complete search history.

(56) References Cited

U.S. PATENT DOCUMENTS

| | | |
|---|---|---|
| D479,712 S | 9/2003 | Ng |
| D490,068 S | 5/2004 | Chen |

(Continued)

FOREIGN PATENT DOCUMENTS

| | | |
|---|---|---|
| EM | 000007901-0001 | 4/2003 |
| EM | 000120464-0001 | 12/2003 |

(Continued)

OTHER PUBLICATIONS

Zac Hall: "Review: Sony's XAV-AX100 CarPlay receiver pairs tasteful design with a fair price at the expense of display tech," 9TO5Mac (Feb. 20, 2017). <https://9to5mac.com/2017/02/20/review-sony-xav-ax100-receiver-carplay/>.

(Continued)

*Primary Examiner* — Hua Lu
(74) *Attorney, Agent, or Firm* — Merchant & Gould P.C.

(57) ABSTRACT

A system is provided for streaming media content in a vehicle. The system includes a personal media streaming appliance system configured to connect to a media delivery system and receive media content from the media delivery system at least via a cellular network. The personal media streaming appliance system operates to transmit a media signal representative to the received media content to a vehicle media playback system so that the vehicle media playback system operates to play the media content in the vehicle.

25 Claims, 16 Drawing Sheets

(56) References Cited

U.S. PATENT DOCUMENTS

| | | | |
|---|---|---|---|
| D512,049 S | 11/2005 | Yang | |
| D524,292 S | 7/2006 | Tyneski et al. | |
| D525,612 S | 7/2006 | Densho | |
| D582,392 S | 12/2008 | Pauschitz et al. | |
| D603,378 S | 11/2009 | Paradise | |
| D609,698 S | 2/2010 | Ng | |
| D620,926 S | 8/2010 | Wai | |
| D623,629 S | 9/2010 | Lau | |
| D630,620 S | 6/2011 | Lee et al. | |
| D643,399 S | 8/2011 | Clemons et al. | |
| D644,200 S | 8/2011 | Bolton | |
| 8,175,279 B2* | 5/2012 | Tiwari | B60R 11/02 381/1 |
| D664,125 S | 7/2012 | Koch et al. | |
| D674,775 S | 1/2013 | Bolton | |
| D745,856 S | 12/2015 | Lopez | |
| 2001/0034714 A1* | 10/2001 | Terao | H04L 63/0442 705/57 |
| 2004/0225519 A1* | 11/2004 | Martin | G11B 27/11 705/53 |
| 2005/0202845 A1* | 9/2005 | Sasaki | G08G 1/096741 455/556.2 |
| 2006/0176369 A1* | 8/2006 | Meritt | G08B 13/19621 348/143 |
| 2006/0240811 A1* | 10/2006 | De Luca | H04L 12/18 455/414.3 |
| 2007/0108788 A1 | 5/2007 | Shalam et al. | |
| 2007/0242834 A1* | 10/2007 | Coutinho | H04R 5/04 381/71.8 |
| 2008/0049949 A1* | 2/2008 | Snider | H05K 5/0217 381/86 |
| 2008/0300782 A1* | 12/2008 | Kohno | G01C 21/3688 701/408 |
| 2008/0318518 A1* | 12/2008 | Coutinho | H04H 20/62 455/3.06 |
| 2010/0120366 A1* | 5/2010 | DeBiasio | H04M 1/6091 455/41.3 |
| 2010/0138581 A1 | 6/2010 | Bird et al. | |
| 2011/0014872 A1* | 1/2011 | Langham | H04M 1/6075 455/41.3 |
| 2011/0039606 A1* | 2/2011 | Kim | H04W 52/0261 455/574 |
| 2011/0116642 A1* | 5/2011 | Hall | H04R 5/04 381/58 |
| 2012/0095643 A1* | 4/2012 | Bose | B60K 37/00 701/32.8 |
| 2012/0159472 A1* | 6/2012 | Hong | H04W 4/00 717/178 |
| 2013/0137476 A1* | 5/2013 | Kawaguchi | H04W 4/029 455/519 |
| 2013/0302758 A1* | 11/2013 | Wright | G07C 5/008 434/65 |
| 2013/0339384 A1* | 12/2013 | Waites | G06Q 40/04 707/769 |
| 2013/0346661 A1 | 12/2013 | Hasenei | |
| 2014/0297674 A1* | 10/2014 | Rhee | H04N 21/41407 707/758 |
| 2014/0342718 A1* | 11/2014 | Chen | H04W 4/027 455/418 |
| 2015/0017965 A1* | 1/2015 | Lim | H04W 52/0258 455/418 |
| 2015/0023518 A1* | 1/2015 | Mizrahi | H04B 1/0343 381/74 |
| 2015/0086175 A1* | 3/2015 | Lorenzetti | H04N 9/8211 386/226 |
| 2015/0237750 A1 | 8/2015 | Yang | |
| 2017/0054842 A1* | 2/2017 | Choi | B60W 40/08 |
| 2017/0181208 A1* | 6/2017 | Burns | H04W 76/14 |
| 2017/0333936 A1* | 11/2017 | Juzswik | H04M 1/7253 |
| 2018/0146078 A1* | 5/2018 | Shin | A45C 11/00 |
| 2019/0100154 A1* | 4/2019 | Anisfeld | F16M 11/041 |

FOREIGN PATENT DOCUMENTS

| | | |
|---|---|---|
| EM | 000309992-0001 | 3/2005 |
| EM | 001090237-0001 | 2/2009 |
| EM | 001094775-0001 | 2/2009 |
| EM | 001513623-0001 | 5/2009 |
| EM | 001148290-0001 | 6/2009 |
| EM | 001148290-0002 | 6/2009 |
| EM | 001155840-0001 | 7/2009 |
| EM | 001624891-0001 | 10/2009 |
| EM | 001185235-0003 | 12/2009 |
| EM | 001186126-0001 | 12/2009 |
| EM | 002604926-0001 | 12/2014 |
| EP | 2019351 A2 | 1/2009 |
| WO | 2008/061205 A2 | 5/2008 |
| WO | D081576-0001 | 11/2012 |
| WO | D086478-0008 | 10/2014 |
| WO | D089534-0002 | 1/2016 |
| WO | D093125-0005 | 6/2016 |
| WO | D095082-0001 | 3/2017 |

OTHER PUBLICATIONS

"Muse: The Simple Dedicated Amazon Alexa Add on for Cars," Mi Community (Nov. 14, 2017). <http://c.mi.com/thread-533822-1-0.html>.

"Cleanskin universal magnetic holder small mount", Officeworks, accessed Jan. 19, 2018. Available at: https://www.officeworks.com.au/shop/officeworks/p/cleanskin-universal-magnetic-holder-small-mount-csmsul999b.

"Air Vent Car Mount Cell Phone Holder, JEBSENS CA02 Magnetic Air Vent Car Mount, Portable Universal Car GPS Smartphone Holder Mount, Apple iPhone 6 / 6 Plus (5.5"), 3 Metal Plates & Protection Film", Jebsens, accessed Jan. 19, 2018. Available at: https://www.amazon.com/JEBSENS-CA02-Universal-Smartphone-Protection/dp/B0144AX6WK.

\* cited by examiner

PERSONAL MEDIA STREAMING APPLIANCE SYSTEM

BACKGROUND

Many people enjoy consuming media content while travelling or during other activities. For example, many drivers and passengers listen to audio content, such as songs, albums, podcasts, audiobooks, and other types of audible content, in vehicles. Typical sources of such audio content in vehicles include radios and fixed media players, such as devices that can play media content from CDs, USB drives, or SD cards. Media content from such typical sources is not flexible or personalized for the listeners in vehicles.

Alternatively, mobile devices, such as mobile phones or tablets running audio streaming applications, can offer a personalized and flexible music-consuming experience using large catalogs of media content available from a media content server. However, mobile devices are not well suited for a vehicle environment for various reasons, such as legal restrictions and sophisticated user interfaces that are not convenient for use in a vehicle.

There exists a need for a media playback system that is easy to use and control for media content playback while providing personalized user experience of consuming media content in a vehicle.

SUMMARY

In general terms, the present disclosure relates to a personal media streaming appliance system. In one possible configuration and by non-limiting example, the system is configured to stream personalized media content for playback in a vehicle. Various aspects are described in this disclosure, which include, but are not limited to, the following aspects.

One aspect is a personal appliance system for streaming media content for playback by a vehicle media playback system of a vehicle. The system include a docking device and a personal media streaming appliance. The docking device has an appliance coupling structure and a vehicle mounting portion. The vehicle mounting portion is arranged opposite to the appliance coupling structure and configured to mount the docking device to the vehicle. The personal media streaming appliance includes a body, a dock mounting structure, at least one processing device, at least one data storage device, a manual user interface system, a cellular-based media streaming system, a noise-cancelling voice interaction system, and an appliance operation system. The body defines an interior space and has a front side and an opposite rear side. The dock mounting structure is arranged on the rear side and configured to engage the appliance coupling structure of the docking device. The at least one processing device is contained in the interior space of the body. The at least one data storage device is contained in the interior space of the body and stores data instructions executable by the at least one processing device. The manual user interface system is configured to receive manual user input for controlling playback of media content. The user interface system includes a rotatable manual control knob assembly arranged at the front side of the body, and a plurality of depressible preset button assemblies. The at least one data storage device includes a manual input processing engine configured to detect the manual user input and control playback of the media content based on the manual user input. The cellular-based media streaming system includes a wireless data communication device configured to communicate with a media content provider via a cellular network. The noise-cancelling voice interaction system includes at least one microphone configured to detect sounds in the vehicle. The at least one data storage device includes a sound processing engine that operates to identify a voice input from the detected sounds in the vehicle, and a voice interaction engine that operates to cooperate with the media content provider to determine a command intended by the voice input. The appliance operation system includes a power input device and a media content output interface. The power input device is configured to be electrically connected to a power source of the vehicle and receive electric power from the vehicle. The at least one data storage device includes a media content processing engine that operates to process the media content and generate and transmit through the media content output interface a media content signal that is usable by the vehicle media playback system for playback of the media content.

In certain example, in the cellular-based media streaming system, the at least one data storage device includes at least one of a device identifier and a user account identifier. The device identifier identifies the personal media streaming appliance, and the user account identifier identifies a user of the media content provider. The at least one data storage device further includes a wireless data communication engine that operates to transmit at least one of the device identifier and the user account identifier to the media content provider and receive media content associated with the at least one of the device identifier and the user account identifier from the media content provider at least partially via the cellular network.

In certain examples, the appliance operation system further includes an appliance activation engine that is automatically activated by the at least one processing device upon powering up the personal media streaming appliance, the appliance activation engine configured to at least partially operates at least one of the other engines upon activation.

In certain examples, the appliance activation engine continues running until the personal media streaming appliance is powered down below a predetermined power level.

In certain examples, the personal media streaming appliance is free of user interface controls that would allow a user to disable operation of the appliance activation engine on the personal media streaming appliance.

In certain examples, the appliance operation system further includes a battery and a power management engine. The battery is incorporated in the interior space of the body. The power management engine is configured to charge the battery with the electric power received from the power source of the vehicle through the power input device.

In certain examples, the media content provider includes a media content source.

In certain examples, the personal media streaming appliance further includes a display device arranged on the manual control knob assembly and configured to display information relating to the playback of the media content.

In certain examples, the manual control knob assembly is manually operable in a plurality of movements relative to the body. The plurality of movements corresponds to a plurality of manual inputs. In certain examples, the plurality of movements includes a rotational movement of at least a portion of the manual control knob assembly relative to the body.

In certain examples, the dock mounting structure of the personal media streaming appliance is constructed to have a non-circular profile. In certain examples, the dock mounting structure of the personal media streaming appliance includes a recessed portion provided on the rear side of the body. The recessed portion has a non-circular profile.

In certain examples, the appliance coupling structure of the docking device is constructed to complementarily engage the non-circular profile of the dock mounting structure of the personal media streaming appliance, thereby forming a mechanical interface therebetween configured to resist a rotational force applied by a user upon a rotation of the manual control knob assembly. In certain examples, the appliance coupling structure of the docking device includes a protruded portion, the protruded portion having a non-circular profile that is complementary to the recessed portion.

In certain examples, the personal media streaming appliance further includes a plurality of appliance connectors provided in the dock mounting structure.

In certain examples, the docking device includes a dock body, a plurality of dock connectors, a power source input device, and a media signal output device. The plurality of dock connectors are provided in the appliance coupling structure and arranged to align with the plurality of appliance connectors and connect with the plurality of appliance connectors when the appliance coupling structure engages with the dock mounting structure. The power source input device is configured to be electrically connected to the power source of the vehicle. The power source input device is configured to receive the electric power from the vehicle and transmit the electric power to the power input device of the personal media streaming appliance. The media signal output device is configured to be connected to the vehicle media playback system. The media signal output device is configured to receive the media content from the personal media streaming appliance through the media content output interface and transmit the media content to the vehicle media playback system.

In certain examples, the dock mounting structure of the personal media streaming appliance includes an appliance magnetic attachment device included in the interior space of the body and arranged adjacent the rear side of the body. In certain examples, the appliance magnetic attachment device includes one or more first magnetic plates with a polarity, and one or more second magnetic plates with an opposite polarity.

In certain examples, the docking device further includes a dock magnetic attachment device including in the dock body and configured to interact with the appliance magnetic attachment device to removably secure the appliance coupling portion to the dock coupling portion. In certain examples, the dock magnetic attachment includes one or more first magnets and one or more second magnets. The first magnets are configured to attract the first magnetic plates of the personal media streaming appliance, and the second magnets are configured to attract the second magnetic plates of the personal media streaming appliance. In certain examples, at least one of the first magnets and at least one of the second magnets are alternately arranged.

In certain examples, at least one of the power source input device and the media signal output device is configured with at least one of a USB cable and an auxiliary cable.

In certain examples, the plurality of appliance connectors includes a power input connector configured to receive power from the docking device, and a media signal output connector configured to transmit media content.

In certain examples, the plurality of dock connectors includes a power output connector and a media signal input connector. The power output connector is connected to the power source input device of the docking device. The power output connector is arranged to connect with the power input connector of the appliance and configured to provide power to the appliance. The media signal input connector is arranged to connect with the media signal output connector of the appliance, and configured to receive the media content from the appliance and transmit the media content to the vehicle media playback system via the media signal output device.

In certain examples, the plurality of appliance connectors includes a first docking status identification connector. The plurality of dock connectors includes a second docking status identification connector arranged to connect with the first docking status identification connector to determine that the appliance is mounted to the docking device in a predetermined configuration.

DETAILED DESCRIPTION

Figure 1:
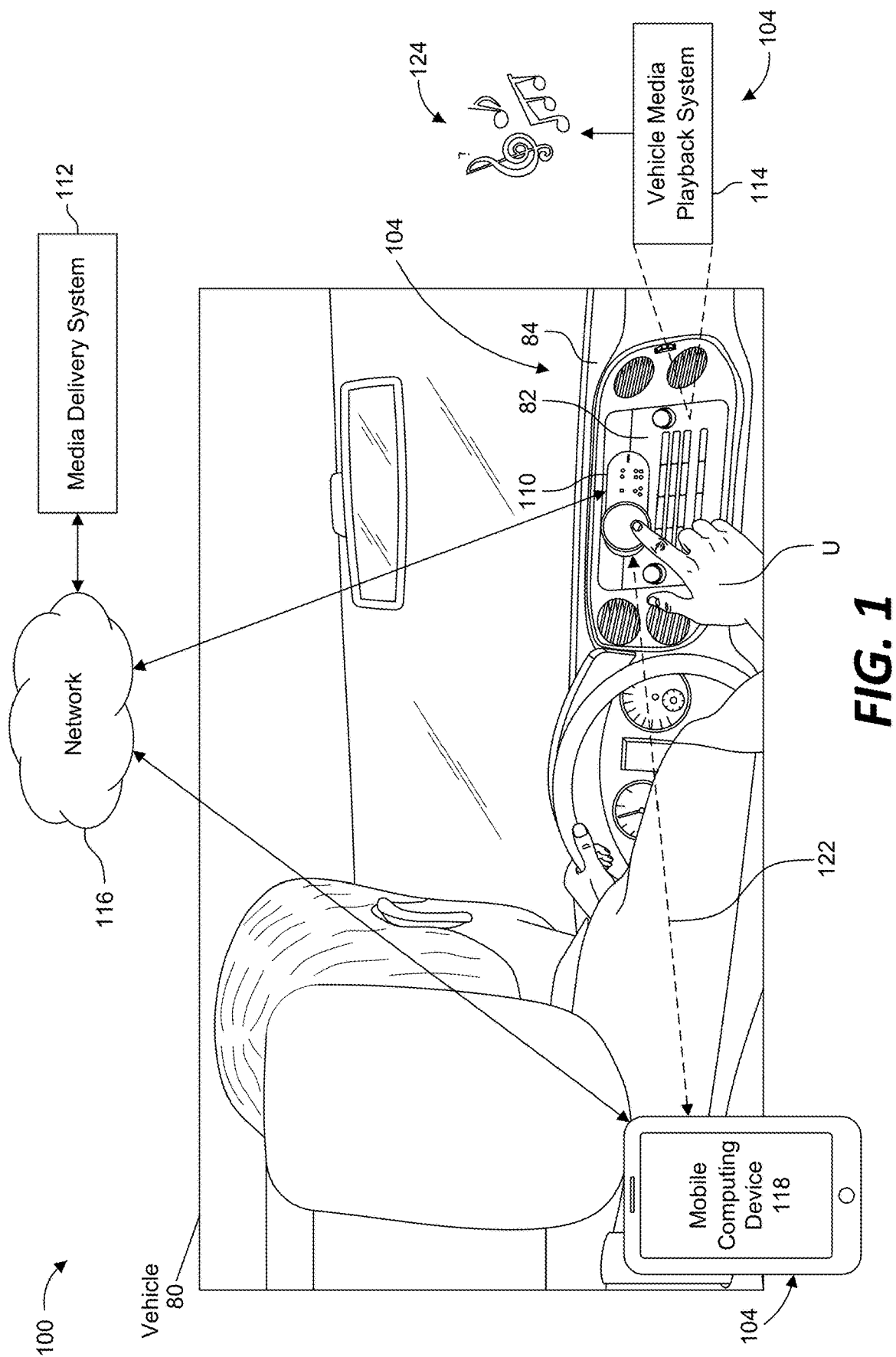
FIG. 1 illustrates an example system for streaming media content for playback.

Various embodiments will be described in detail with reference to the drawings, wherein like reference numerals represent like parts and assemblies throughout the several views.

People spend a significant amount of time travelling in vehicles. Many of them find that time to be more enjoyable when they are listening to music, watching videos, or otherwise consuming media content. Media content includes audio and video content. Examples of audio content include songs, albums, playlists, radio stations, podcasts, audiobooks, and other audible media content items. Examples of video content include movies, music videos, television programs, and other visible media content items. In many cases, video content also includes audio content. As used herein, the term "vehicle" can be any machine that is operable to transport people or cargo. Vehicles can be motorized or non-motorized. Vehicles can be for public or private transport. Examples of vehicles include motor vehicles (e.g., cars, trucks, buses, and motorcycles), rail vehicles (e.g., trains, trams), tracked vehicles, watercraft (e.g., ships, boats), aircraft, human-powered vehicles (e.g., bicycles), wagons, and other transportation means. A user can drive a vehicle or ride in as a passenger for travelling. As used herein, the term "travel" and variants thereof refers to any activity in which a user is in transit between two locations.

Consuming media content in a vehicle presents many challenges. In general, a user in a moving vehicle may have limited attention available for interacting with a media playback device due to the need to concentrate on travel related activities, such as driving and navigation. Therefore, while a vehicle is moving, it can be difficult for a user in the vehicle to interact with a media playback device without disrupting the driving or navigation. Further, the user interface of a media playback device can be overly complex, or may require such fine motor skills that it can be difficult to use while traveling in a vehicle. Voice-based user interfaces also encounter significant challenges to use in a vehicle environment. The passenger areas of a vehicle are often noisy due to engine noise, road noise, wind and weather noises, passenger noises, and the sound of any media content that may be playing on a media playback system in the vehicle. This noise hampers the ability of the voice-based user interface to interact with a user. Moreover, accessing media content while travelling may be difficult, expensive, or impossible depending on network availability or capacity along the route of travel. Further, accessing and playing media content can require significant amounts of electric power. Thus, use of a mobile device for media content playback during travel may be undesirable because it will drain the battery. It can also be challenging to connect a media playback device to a vehicle's built-in audio system because of the requirement to connect to auxiliary cables or undergo a complicated wireless pairing process. Embodiments disclosed herein address some or all of these challenges. It should be understood, however, that various aspects described herein are not limited to use of a media playback device during travel.

On the other hand, many users desire a personalized media consuming experience. For example, a user can access almost limitless catalogs of media content through various free or fee-based media delivery services, such as media streaming services. Users can use mobile devices or other media playback devices to access large catalogs of media content. Due to such large collections of media content, it is desired to make it possible to customize a selection of media content to match users' individual tastes and preferences so that users can consume their favorite media content while traveling in a vehicle.

Many vehicles include a built-in media playback device, such as a radio or a fixed media player, such as a player that can play media content from a CD, USB driver, or SD cards. However, the media content that is delivered using these built in vehicle media playback devices is greatly limited and is not flexible or customizable to the user.

Alternatively, a mobile device, such as a smartphone or a tablet, can be used by a user to enjoy personalized and flexible music consuming experience in a vehicle by running music streaming applications thereon. However, mobile devices are not well suited for use in a vehicle environment for various reasons. For example, mobile devices are not readily accessible or controllable while driving or navigating. Further, connection between a mobile device and a vehicle audio system is often inconvenient and unreliable. Moreover, the music streaming application is not automatically ready to run and play media content, and the user needs to pick up the mobile device and open the music streaming application and control a sophisticated user interface to play media content. Additionally, many users have limited mobile data available via their mobile devices and are concerned about data usage while using the music streaming application in the vehicle. Battery drainage and legal restrictions on use while driving are further drawbacks to using mobile devices for playing media content in the vehicle.

To address these challenges, the present disclosure provides a special-purpose personal appliance that can be used for streaming media in a vehicle. In some embodiments, the appliance is specially designed to be dedicated for media streaming purposes in a vehicle, and there is no other general use. Some embodiments of the appliance can operate to communicate directly with a media content server and receive streamed media content from the server via a cellular network. In these embodiments, other computing devices, such as mobile devices, are not involved in this direct communication between the appliance and the media content server. Mobile data cost can be included in the subscription of the media streaming service or a purchase price of the personal appliance. Therefore, the customer's possible concern about mobile data usage can be eliminated. In other embodiments, the appliance can connect to another computing device, such as a mobile device, that provides a mobile hotspot to enable the appliance to communicate with the media content server rather than the appliance communicating with it directly. For example, a mobile device is used to assist in communication between the appliance and the media content server.

Further, the appliance can be associated with a user account of the user for the media streaming service so that the user can enjoy personalized media content.

In some embodiments, the appliance provides a simplified user interface so that a user can easily control playback of media content in a vehicle while maintaining his or her focus on other tasks such as driving or navigating. For example, the appliance has a limited set of physical control elements that are intuitively controllable for playback of media content with little (often only one) input from a user. Examples of such physical control elements include a rotatable knob and one or more physically-depressible buttons.

Further, in some embodiments, the appliance is configured to be easily mounted to an interior structure of a vehicle, such as a dashboard, so that the user can easily reach the appliance.

In some embodiments, the appliance also provides an output interface that can be easily connected to a vehicle audio system, such as via an auxiliary input port, Bluetooth, or an FM transmitter. Therefore, the media content streamed to the appliance can then be transmitted from the appliance to the vehicle audio system for playback in the vehicle.

In some embodiments, the appliance can include a voice interaction system designed for voice interaction with a user in the noisy environment of a vehicle. In some embodiments, the appliance includes multiple microphones that reduce the effects of ambient noise in the passenger area of the vehicle. In an example, the appliance includes at least three microphones: two directed to the passenger area of the vehicle and another facing away from the passenger area of the vehicle to pick up vibrations and low frequency noise for cancellation. The appliance also applies spectral noise cancellation to reduce non-voice frequencies. In addition, omnidirectional noise cancellation is applied in some embodiments to reduce omni-directional sound (e.g., vehicle noise). Directional noise is detected by determining a difference between audio inputs detected by the two microphones facing the passenger area. The difference is preserved as directional audio input. The appliance further cancels out audio that it is currently playing, allowing the appliance to detect voice commands even over loud music, for instance. In this manner, the appliance is arranged to provide an improved voice-based interface in a vehicle environment.

As described herein, consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, a vehicle is described as an example of an environment in which media content is consumed. Further, traveling (and in particular driving) in a vehicle is described as an example of an activity during which media content is consumed. However, it should be understood that the same concepts are similarly applicable to other forms of media consumption and to other environments or activities, and at least some embodiments include other forms of media consumption and/or are configured for use in other environments or during other activities.

FIG. 1 illustrates an example system 100 for streaming media content for playback. The system 100 can be used in a vehicle 80. The vehicle 80 includes a dashboard 82 or a head unit 84. The system 100 includes one or more media playback devices 104 configured to play media content, such as a personal media streaming appliance (PMSA) system 110, a media delivery system 112, a vehicle media playback system 114, and a mobile computing device 118. The system 100 further includes a data communication network 116 and an in-vehicle wireless data communication network 122.

The PMSA system 110 operates to receive media content that is provided (e.g., streamed, transmitted, etc.) by a system external to the PMSA system 110, such as the media delivery system 112, and transmit the media content to the vehicle media playback system 114 for playback. In some embodiments, the PMSA system 110 is a portable device which can be carried into and used in the vehicle 80. The PMSA system 110 can be mounted to a structure of the vehicle 80, such as the dashboard 82 or the head unit 84. In other embodiments, the PMSA system 110 can be configured to be built in a structure of the vehicle 80. An example of the PMSA system 110 is illustrated and described in more detail with reference to FIGS. 2 and 6.

The media delivery system 112 operates to provide media content to one or more media playback devices 104 via the network 116. In the illustrated example, the media delivery system 112 provides media content to the PMSA system 110 for playback of media content using the vehicle media playback system 114. An example of the media delivery system 112 is illustrated and described in further detail herein, such as with reference to FIG. 3.

The vehicle media playback system 114 operates to receive media content from the PMSA system 110 and generates a media output 124 to play the media content in the vehicle 80. An example of the vehicle media playback system 114 is illustrated and described in further detail herein, such as with reference to FIG. 4.

The network 116 is a data communication network that facilitates data communication between the PMSA system 110 and the media delivery system 112. In some embodiments, the mobile computing device 118 can also communicate with the media delivery system 112 across the network 116. The network 116 typically includes a set of computing devices and communication links between the computing devices. The computing devices in the network 116 use the links to enable communication among the computing devices in the network. The network 116 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 116 includes various types of communication links. For example, the network 116 can include wired and/or wireless links, including cellular, Bluetooth, ultra-wideband (UWB), 802.11, ZigBee, and other types of wireless links. Furthermore, in various embodiments, the network 116 is implemented at various scales. For example, the network 116 can be implemented as one or more vehicle area networks, local area networks (LANs), metropolitan area networks, subnets, wide area networks (WAN) (such as the Internet), or can be implemented at another scale. Further, in some embodiments, the network 116 includes multiple networks, which may be of the same type or of multiple different types.

In some embodiments, the network 116 can also be used for data communication between other media playback devices 104 (e.g., the mobile computing device 118) and the media delivery system 112. Because the network 116 is configured primarily for data communication between computing devices in the vehicle 80 and computing devices outside the vehicle 80, the network 116 is also referred to herein as an out-of-vehicle network for out-of-vehicle data communication.

Unlike the network 116, the in-vehicle wireless data communication 122 can be used for direct data communication between computing devices (e.g., the media playback devices 104) in the vehicle 80. In some embodiments, the in-vehicle wireless data communication 122 is used for direct communication between the PMSA system 110 and the mobile computing device 118. In other embodiments, the mobile computing device 118 can communicate with the PMSA system 110 in the data communication network 116. In some embodiments, the in-vehicle wireless data communication 122 can also be used for data communication between the PMSA system 110 and the vehicle media playback system 114.

Various types of wireless communication interfaces can be used for the in-vehicle wireless data communication 122. In some embodiments, the in-vehicle wireless data communication 122 includes Bluetooth® technology. In other embodiments, the in-vehicle wireless data communication 122 includes Wi-Fi® technology. In yet other embodiments, other suitable wireless communication interfaces can be used for the in-vehicle wireless data communication 122, such as near field communication (NFC) and an ultrasonic data transmission.

In some embodiments, the mobile computing device 118 is configured to play media content independently from the PMSA system 110. In some embodiments, the mobile computing device 118 is a standalone computing device that, without the PMSA system 110 involved, can communicate with the media delivery system 112 and receive media content from the media delivery system 112 for playback in the vehicle 80. An example of the mobile computing device 118 is illustrated and described in further detail herein, such as with reference to FIG. 5.

Figure 2:
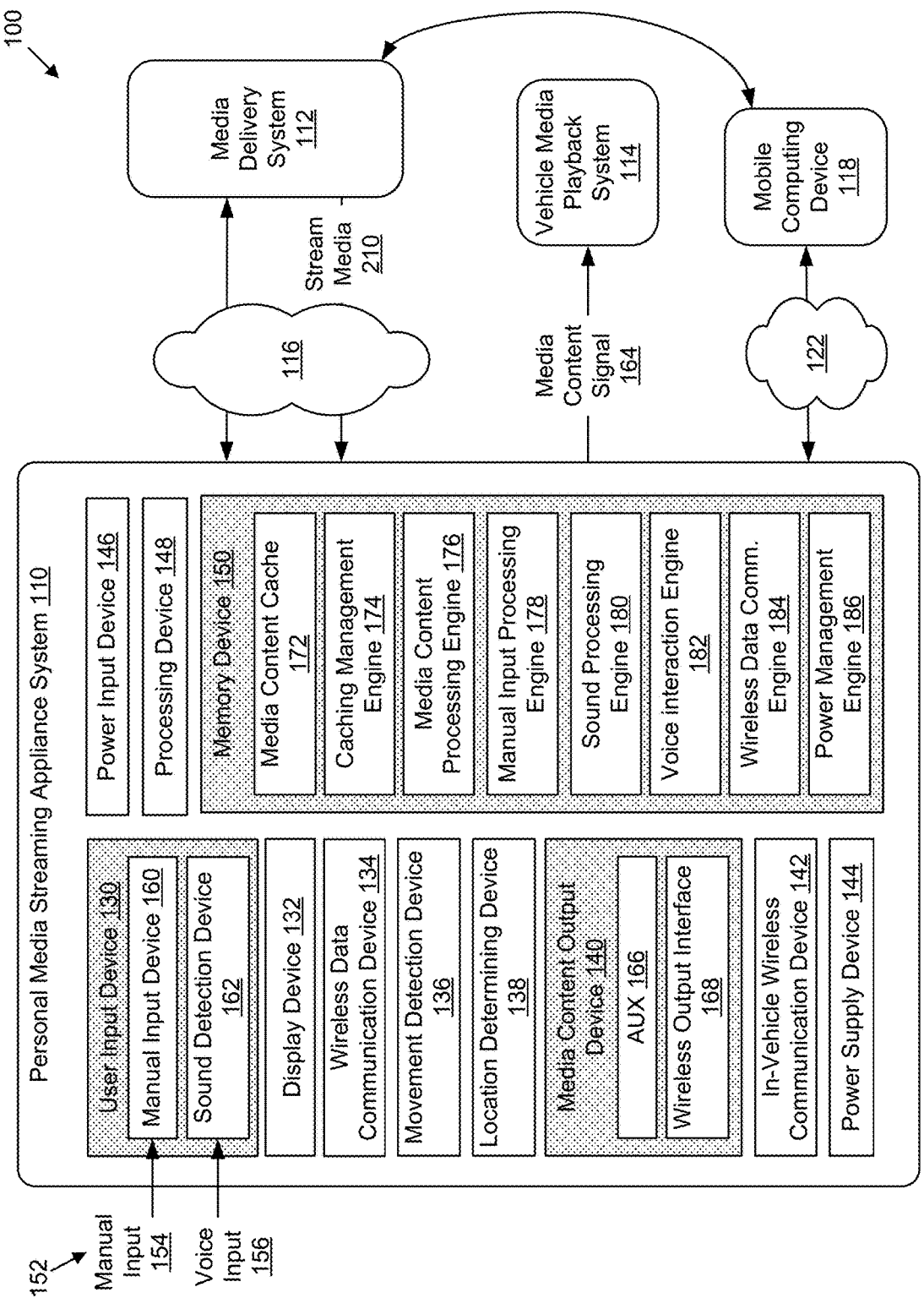
FIG. 2 is a block diagram of an example embodiment of a personal media streaming appliance (PMSA) system.

FIG. 2 is a block diagram of an example embodiment of the PMSA system 110 of the media streaming system 100 shown in FIG. 1. In this example, the PMSA system 110 includes a user input device 130, a display device 132, a wireless data communication device 134, a movement detection device 136, a location determining device 138, a media content output device 140, an in-vehicle wireless communication device 142, a power supply device 144, a power input device 146, a processing device 148, and a memory device 150.

In some embodiments, the PMSA system 110 is a system dedicated for streaming personalized media content in a vehicle environment. At least some embodiments of the PMSA system 110 have limited functionalities specifically selected for streaming media content from the media delivery system 112 at least via the network 116 and/or for providing other services associated with the media content streaming service. The PMSA system 110 may have no other general use such as found in other computing devices, such as smartphones, tablets, and other smart devices. For example, in some embodiments, when the PMSA system 110 is powered up, the PMSA system 110 is configured to automatically activate a software application that is configured to perform the media content streaming and media playback operations of the PMSA system 110 using at least one of the components, devices, and elements of the PMSA system 110. In some embodiments, the software application of the PMSA system 110 is configured to continue running until the PMSA system 110 is powered off or powered down to a predetermined level. In some embodiments, the software application is provided by the media content provider. In some embodiments, the PMSA system 110 is configured to be free of any user interface control that would allow a user to disable the automatic activation of the software application on the PMSA system 110.

As described herein, the PMSA system 110 provides various structures, features, and functions that improve the user experience of consuming media content in a vehicle.

As illustrated, the PMSA system 110 can communicate with the media delivery system 112 to receive media content via the network 116 and enable the vehicle media playback system 114 to play the media content in the vehicle. In some embodiments, the PMSA system 110 can communicate with the mobile computing device 118 that is in data communication with the media delivery system 112. As described herein, the mobile computing device 118 can communicate with the media delivery system 112 via the network 116.

The user input device 130 operates to receive a user input 152 from a user U for controlling the PMSA system 110. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the PMSA system 110. In addition, in some embodiments, the manual input 154 is received for managing various pieces of information transmitted via the PMSA system 110 and/or controlling other functions or aspects associated with the PMSA system 110.

In some embodiments, the manual input device 160 includes one or more manual control elements configured to receive various manual control actions, such as pressing actions and rotational actions. As described herein, the physical input device 160 includes a manual control knob assembly 510 and one or more physical button assemblies 512, which is further illustrated and described with reference to FIG. 6.

The sound detection device 162 operates to detect and record sounds from proximate the PMSA system 110. For example, the sound detection device 162 can detect sounds including the voice input 156. In some embodiments, the sound detection device 162 includes one or more acoustic sensors configured to detect sounds proximate the PMSA system 110. For example, acoustic sensors of the sound detection device 162 include one or more microphones. Various types of microphones can be used for the sound detection device 162 of the PMSA system 110.

In some embodiments, the voice input 156 is a user's voice (also referred to herein as an utterance) for controlling playback of media content via the PMSA system 110. In addition, the voice input 156 is a user's voice for managing various data transmitted via the PMSA system 110 and/or controlling other functions or aspects associated with the PMSA system 110.

In some embodiments, the sound detection device 162 is configured to cancel noises from the received sounds so that a desired sound (e.g., the voice input 156) is clearly identified. For example, the sound detection device 162 can include one or more noise-canceling microphones which are configured to filter ambient noise from the voice input 156. In addition or alternatively, a plurality of microphones of the sound detection device 162 are arranged at different locations in a body of the PMSA system 110 and/or oriented in different directions with respect to the body of the PMSA system 110, so that ambient noise is effectively canceled from the voice input 156 or other desired sounds being identified.

In some embodiments, the sounds detected by the sound detection device 162 can be processed by the sound processing engine 180 of the PMSA system 110 as described below.

Referring still to FIG. 2, the display device 132 operates to display information to the user U. Examples of such information include media content playback information, notifications, and other information.

In some embodiments, the display device 132 operates as a display screen only and is not capable of receiving a user input. By receiving the manual input 154 only via the manual input device 160 and disabling receipt of manual input via the display device 132, the user interface of the PMSA system 110 is simplified so that the user U can control the PMSA system 110 while maintaining focus on other activities in the vehicle 80. It is understood however that, in other embodiments, the display device 132 is configured as a touch-sensitive display screen that operates as both a display screen and a user input device. In yet other embodiments, the PMSA system 110 does not include a display device.

As described herein, in some embodiments, the display device 132 is arranged at the manual input device 160. In other embodiments, the display device 132 is arranged separate from the manual input device 160.

The wireless data communication device 134 operates to enable the PMSA system 110 to communicate with one or more computing devices at a remote location that is outside the vehicle 80. In the illustrated example, the wireless data communication device 134 operates to connect the PMSA system 110 to one or more networks outside the vehicle 80, such as the network 116. For example, the wireless data communication device 134 is configured to communicate with the media delivery system 112 and receive media content from the media delivery system 112 at least partially via the network 116. The wireless data communication device 134 can be a wireless network interface of various types which connects the PMSA system 110 to the network 116. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In some embodiments, the wireless data communication device 134 is configured as a cellular network interface to facilitate data communication between the PMSA system 110 and the media delivery system 112 over cellular network.

The movement detection device 136 can be used to detect movement of the PMSA system 110 and the vehicle 80. In some embodiments, the movement detection device 136 is configured to monitor one or more factors that are used to determine movement of the vehicle 80. The movement detection device 136 can include one or more sensors that are configured to detect movement, position, and/or orientation of the PMSA system 110. As an example, the movement detection device 136 is operable to determine an orientation of the PMSA system 110. The movement detection device 136 can detect changes in the determined orientation and interpret those changes as indicating movement of the PMSA system 110. In some embodiments, the movement detection device 136 includes an accelerometer. In other embodiments, the movement detection device 136 includes a gyroscope. Other sensors can also be used for the movement detection device 136, such as a magnetometer, a GPS receiver, an altimeter, an odometer, a speedometer, a shock detector, a vibration sensor, a proximity sensor, and an optical sensor (e.g., a light sensor, a camera, and an infrared sensor).

The location determining device 138 is a device that determines the location of the PMSA system 110. In some embodiments, the location determining device 138 uses one or more of Global Positioning System (GPS) technology (which may receive GPS signals), Global Navigation Satellite System (GLONASS), cellular triangulation technology, network-based location identification technology, Wi-Fi positioning systems technology, and combinations thereof.

The media content output device 140 is an interface that enables the PMSA system 110 to transmit media content to the vehicle media playback device 114. Some embodiments of the PMSA system 110 do not have a speaker and thus cannot play media content independently. In these embodiments, the PMSA system 110 is not regarded as a standalone device for playing media content. Instead, the PMSA system 110 transmits media content to another media playback device, such as the vehicle media playback device 114 to enable the other media playback device to play the media content, such as through the vehicle stereo system.

As illustrated, the PMSA system 110 (e.g., a media content processing engine 176 thereof in FIG. 2) can convert media content to a media content signal 164, the media content output device 140 transmits the media content signal 164 to the vehicle media playback system 114. The vehicle media playback system 114 can play the media content based on the media content signal 164. For example, the vehicle media playback system 114 operates to convert the media content signal 164 into a format that is readable by the vehicle media playback system 114 for playback.

In some embodiments, the media content output device 140 includes an auxiliary (AUX) output interface 166 and a wireless output interface 168.

Figure 6:
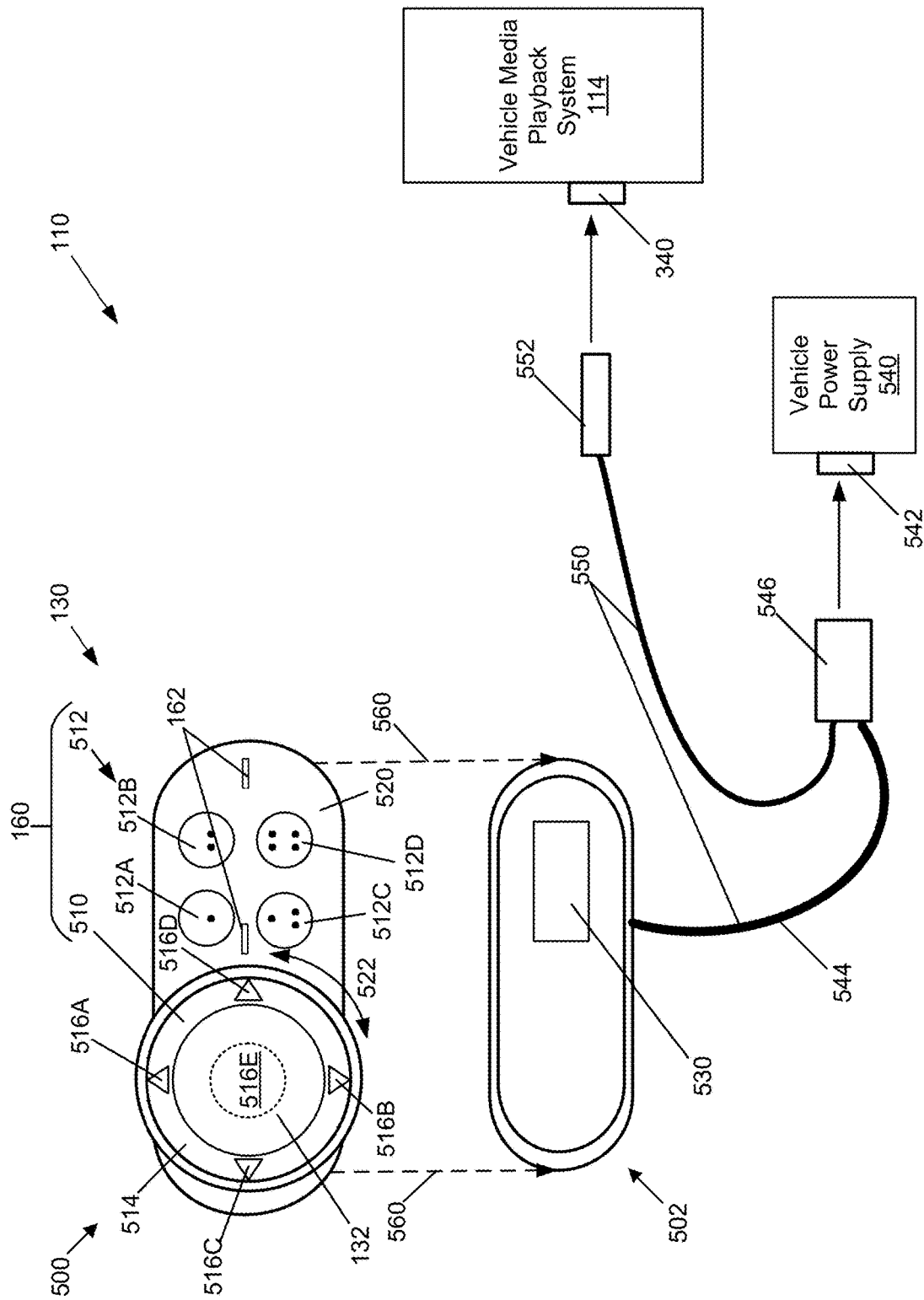
FIG. 6 schematically illustrates an example embodiment of the PMSA system.

The AUX output interface 166 is configured to connect the PMSA system 110 to the vehicle media playback system 114 via a cable (e.g., a media content output line 550 in FIG. 6) of the PMSA system 110. In some embodiments, as illustrated in FIG. 6, the media content output line 550 extending from the PMSA system 110 is connected to an input connector 340 (e.g., an auxiliary input jack or port) of the vehicle media playback system 114. As illustrated herein, the media content output line 550 can be of various types, such as an analog audio cable or a USB cable.

The wireless output interface 168 is configured to connect the PMSA system 110 to the vehicle media playback system 114 via a wireless communication protocol. In some embodiments, the wireless output interface 168 is configured for Bluetooth connection. In other embodiments, the wireless output interface 168 is configured for other types of wireless connection. In some embodiments, the wireless output interface 168 is incorporated into, or implemented with, the in-vehicle wireless communication device 142. For example, when the media content output device 140 wirelessly transmits media content to the vehicle media playback system 114, the in-vehicle wireless communication device 142 can be used to implement the wireless output interface 168 of the media content output device 140.

Referring still to FIG. 2, the in-vehicle wireless communication device 142 operates to establish a wireless data communication, such as the in-vehicle wireless data communication 122, between computing devices in a vehicle 80. In the illustrated example, the in-vehicle wireless communication device 142 is used to enable the PMSA system 110 to communicate with other computing devices, such as the mobile computing device 118, in the vehicle 80. Various types of wireless communication interfaces can be used for the in-vehicle wireless communication device 142, such as Bluetooth Technology®, WiFi® technology, a near field communication (NFC), and an ultrasound data transmission. The in-vehicle wireless communication is also referred to herein as a short-range wireless communication.

The power supply device 144 is included in the example PMSA system 110 and is configured to supply electric power to the PMSA system 110. In some embodiments, the power supply device 144 includes at least one battery. The power supply device 144 can be rechargeable. For example, the power supply device 144 can be recharged using the power input device 146 that is connected to an external power supply. In some embodiments, the power supply device 144 is included inside the PMSA system 110 and is not removable from the PMSA system 110. In other embodiments, the power supply device 144 is removable by the user from the PMSA system 110.

The power input device 146 is configured to receive electric power to maintain activation of components of the PMSA system 110. As described herein, the power input device 146 is connected to a power source of the vehicle 80 (e.g., a vehicle power supply 540 in FIG. 6) and uses the electric power from the vehicle 80 as a primary power source to maintain activation of the PMSA system 110 over an extended period of time, such as longer than several minutes.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the PMSA system 110. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the PMSA system 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a sound processing engine 180, a voice interaction engine 182, a wireless data communication engine 184, and a power management engine 186.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 112, the caching management engine 174 operates to cache at least a portion of the media content into the media content cache 172 so that at least a portion of the cached media content can be transmitted to the vehicle media playback system 114 for playback. In other embodiments, the caching management engine 174 operates to cache at least a portion of media content into the media content cache 172 while online so that the cached media content is retrieved for playback while the PMSA system 110 is offline.

The media content processing engine 176 is configured to process the media content that is received from the media delivery system 112, and generate the media content signal 164 usable for the vehicle media playback system 114 to play the media content. The media content signal 164 is transmitted to the vehicle media playback system 114 using the media content output device 140, and then decoded so that the vehicle media playback system 114 plays the media content in the vehicle 80.

The manual input processing engine 178 operates to receive the manual input 154 via the manual input device 160. In some embodiments, when the manual input device 160 is actuated (e.g., pressed or rotated) upon receiving the manual input 154, the manual input device 160 generates an electric signal representative of the manual input 154. The manual input processing engine 178 can process the electric signal and determine the user input (e.g., the user command or instruction) corresponding to the manual input 154 to the PMSA system 110. In some embodiments, the manual input processing engine 178 can perform a function requested by the manual input 154, such as controlling playback of media content. The manual input processing engine 178 can cause one or more other engines to perform the function associated with the manual input 154.

The sound processing engine 180 is configured to receive sound signals obtained from the sound detection device 162 and process the sound signals to identify different sources of the sounds received via the sound detection device 162. In some embodiments, the sound processing engine 180 operates to filter the user's voice input 156 from noises included in the detected sounds. Various noise cancellation technologies, such as active noise control or cancelling technologies or passive noise control or cancelling technologies, can be used to filter the voice input from ambient noise. In examples, the sound processing engine 180 filters out omnidirectional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, a recording of sounds captured using the sound detection device 162 can be analyzed using speech recognition technology to identify words spoken by the user. The words may be recognized as commands from the user that alter the playback of media content and/or other functions or aspects of the PMSA system 110. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the PMSA system 110 such as volume, dominant frequency or frequencies, etc. These sound properties may be used to make inferences about the environment proximate to the PMSA system 110.

Figure 3:
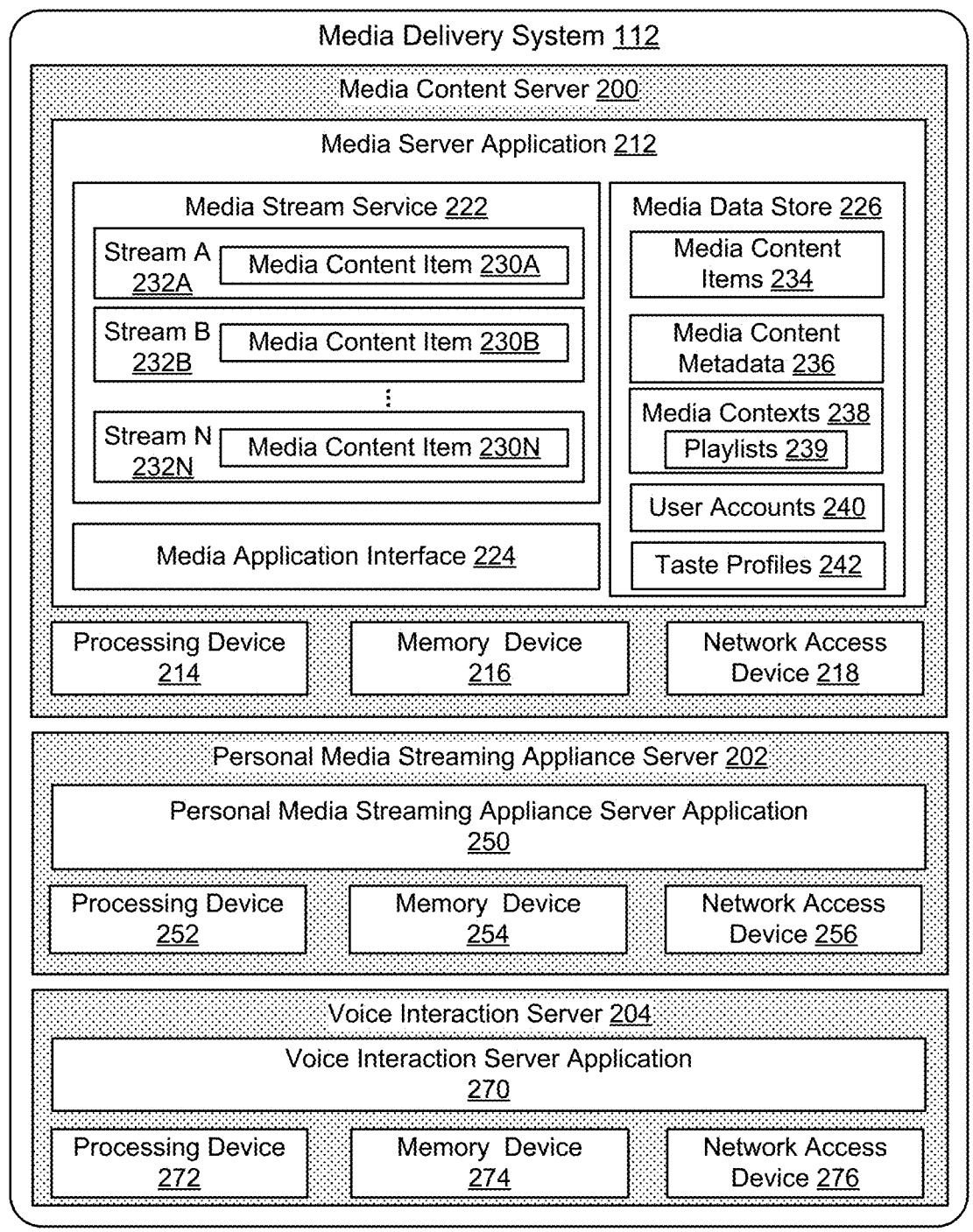
FIG. 3 is a block diagram of an example embodiment of a media delivery system.

The voice interaction engine 182 operates to cooperate with the media delivery system 112 (e.g., a voice interaction server 204 thereof as illustrated in FIG. 3) to identify a command (e.g., a user intent) that is conveyed by the voice input 156. In some embodiments, the voice interaction engine 182 transmits the user's voice input 156 that is detected by the sound processing engine 180 to the media delivery system 112 so that the media delivery system 112 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 112 (e.g., the voice interaction server 204 thereof) to provide a voice assistant that performs various voice-based interactions with the user, such as voice feedbacks, voice notifications, voice recommendations, and other voice-related interactions and services.

The wireless data communication engine 184 can interact with the wireless data communication device 134 and operate to transmit data to other computing devices, such as the media delivery system 112, and receive data from such other computing devices, such as the media delivery system 112, via the network 116. In some embodiments, the wireless data communication engine 184 operates to transmit a device identifier of the PMSA system 110 and/or an user account identifier associated with the PMSA system 110 to the computing device (e.g., the media delivery system 112) with which the PMSA system 110 is communicating via the network 116. The media delivery system 112 can use the device identifier and/or the user account identifier to perform a function requested by the PMSA system 110, such as streaming media content requested by the PMSA system 110.

The power management engine 186 can operate to receive electric power through the power input device 146. The power management engine 186 can further operate to charge or recharge the power supply device 144 with the electric power received through the power input device 146.

In some embodiments, the power management engine 186 operates to manage electric power consumption of the PMSA system 110, and switch the PMSA system 110 into one of a plurality of power consumption modes (e.g., a full power mode or a low power mode (such as a sleep mode)) depending on the operation condition of the PMSA system 110.

FIG. 3 is a block diagram of an example embodiment of the media delivery system 112 of FIG. 1. The media delivery system 112 includes a media content server 200, a personal media streaming appliance (PMSA) server 202, and a voice interaction server 204.

The media delivery system 112 comprises one or more computing devices and provides media content to the PMSA system 110 and, in some embodiments, other media playback devices, such as the mobile computing device 118, as well. In addition, the media delivery system 112 interacts with the PMSA system 110 to provide the PMSA system 110 with various functionalities.

In at least some embodiments, the media content server 200, the PMSA server 202, and the voice interaction server 204 are provided by separate computing devices. In other embodiments, the media content server 200, the PMSA server 202, and the voice interaction server 204 are provided by the same computing device(s). Further, in some embodiments, at least one of the media content server 200, the PMSA server 202, and the voice interaction server 204 is provided by multiple computing devices. For example, the media content server 200, the PMSA server 202, and the voice interaction server 204 may be provided by multiple redundant servers located in multiple geographic locations.

Although FIG. 3 shows a single media content server 200, a single PMSA server 202, and a single voice interaction server 204, some embodiments include multiple media servers, multiple PMSA servers, and/or multiple voice interaction servers. In these embodiments, each of the multiple media servers, multiple PMSA serves, and multiple voice interaction servers may be identical or similar to the media content server 200, the PMSA server 202, and the voice interaction server, respectively, as described herein, and may provide similar functionality with, for example, greater capacity and redundancy and/or services from multiple geographic locations. Alternatively, in these embodiments, some of the multiple media servers, the multiple PMSA servers, and/or the multiple voice interaction servers may perform specialized functions to provide specialized services. Various combinations thereof are possible as well.

The media content server 200 transmits stream media 210 (FIG. 2) to media playback devices such as the PMSA system 110. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 116. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the PMSA system 110, to retrieve media content items from the media content server 200. For example, in FIG. 3, the media application interface 224 receives communication from the PMSA system 110, such as the caching management engine 174 thereof, to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 3, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device 104, such as the PMSA system 110. The media playback device 104 then operates to communicate with the media delivery system 112 so that the media delivery system 112 retrieves the media content items identified by the playlist 239 and transmits data for the media content items to the media playback device 104 for playback.

In some embodiments, the playlist 239 includes a playlist title and a list of content media item identifications. The playlist title is a title of the playlist, which can be provided by a user using the media playback device 104. The list of content media item identifications includes one or more media content item identifications (IDs) that refer to respective media content items 234.

Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 239 may include user-created playlists. For example, a user of a media streaming service provided using the media delivery system 112 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 112 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 239 are created by a media streaming service provider. For example, such provider-created playlists can be automatically created by the media delivery system 112. In some embodiments, a provider-created playlist can be customized to a particular user or a particular group of users. By way of example, a playlist for a particular user can be automatically created by the media delivery system 112 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 112. In some embodiments, a user account 240 allows a user to authenticate to the media delivery system 112 and enable the user to access resources (e.g., media content items, playlists, etc.) provided by the media delivery system 112. In some embodiments, the user can use different devices (e.g., the PMSA system 110 and the mobile computing device 118) to log into the user account and access data associated with the user account in the media delivery system 112. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 112 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 3, the PMSA server 202 operates to provide various functionalities to the PMSA system 110. In some embodiments, the PMSA server 202 includes a personal media streaming appliance (PMSA) server application 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the PMSA server application 250 operates to interact with the PMSA system 110 and enable the PMSA system 110 to perform various functions, such as receiving a user manual input, displaying information, providing notifications, performing power management, providing location-based services, and authenticating one or more users for the PMSA system 110. The PMSA server application 250 can interact with other servers, such as the media content server 200 and the voice interaction server 204, to execute such functions.

Referring still to FIG. 3, the voice interaction server 204 operates to provide various voice-related functionalities to the PMSA system 110. In some embodiments, the voice interaction server 204 includes a voice interaction server application 270, a processing device 272, a memory device 274, and a network access device 276. The processing device 272, the memory device 274, and the network access device 276 may be similar to the processing device 214, the memory device 216, and the network access device 218, respectively, which have each been previously described.

In some embodiments, the voice interaction server application 270 operates to interact with the PMSA system 110 and enable the PMSA system 110 to perform various voice-related functions, such as voice feedback and voice notifications. In some embodiments, the voice interaction server application 270 is configured to receive data (e.g., speech-to-text (STT) data) representative of a voice input received via the PMSA system 110 and process the data to determine a user command (e.g., a user request or instruction). In some embodiments, at least one of the media content server 200, the PMSA server 202, and the voice interaction server 204 may be used to perform one or more functions corresponding to the determined user command.

Figure 4:
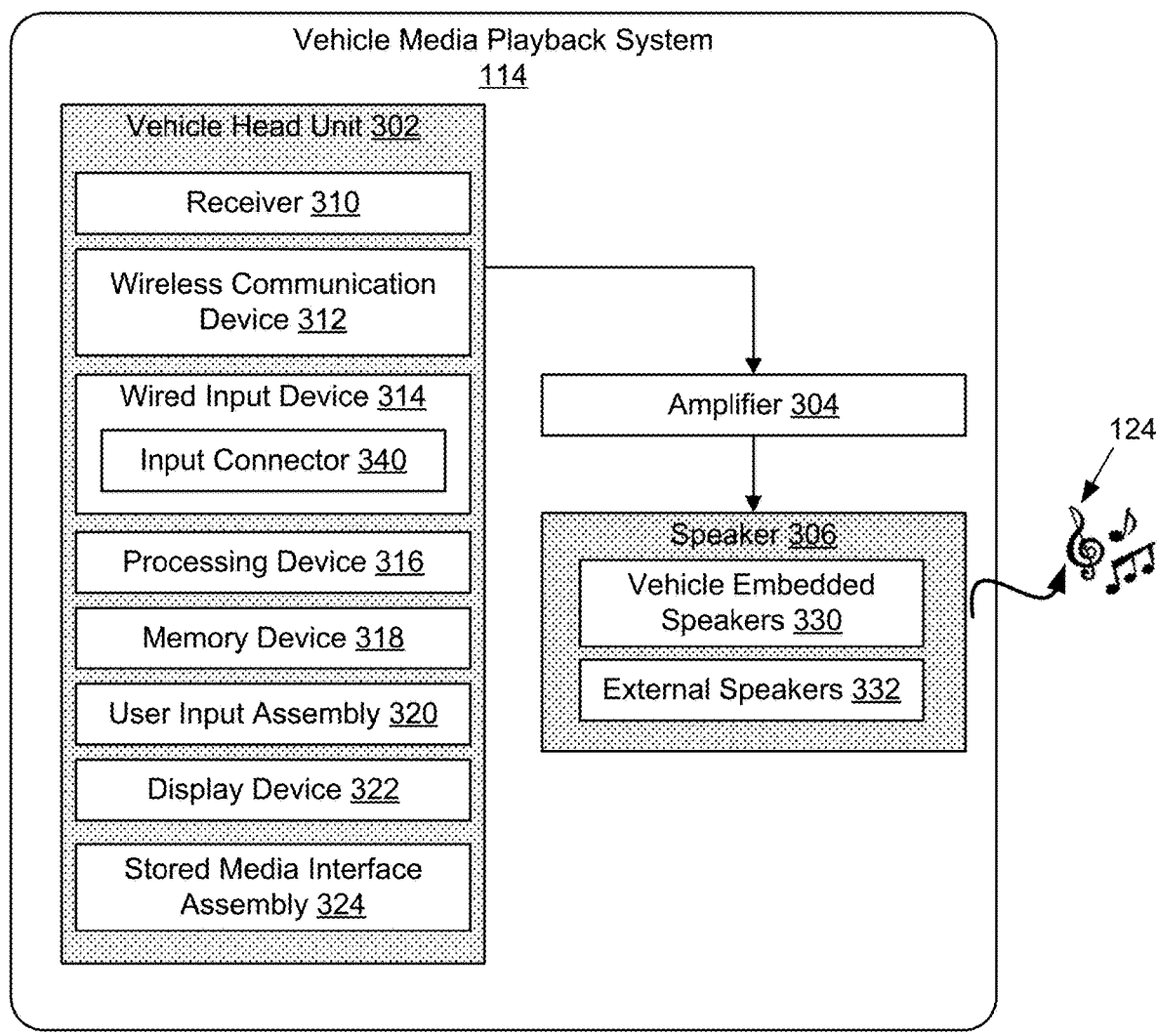
FIG. 4 is a block diagram of an example embodiment of a vehicle media playback system.

FIG. 4 is a block diagram of an example embodiment of the vehicle media playback system 114. In this example, the vehicle media playback system 114 includes a vehicle head unit 302, an amplifier 304, and a speaker 306.

The vehicle head unit 302 is configured to receive a user input and generate media content from various sources. In this example, the vehicle head unit 302 includes a receiver 310, a wireless communication device 312, a wired input device 314, a processing device 316, a memory device 318, a user input assembly 320, a display device 322, and a stored media interface assembly 324.

The receiver 310 operates to receive media content signals from various external sources. The received signals can then be used to generate media output by the vehicle media playback system 114. Some embodiments of the receiver 310 include one or more tuners for receiving radio signals such as FM or AM radio signals. Other embodiments of the receiver 310 include a receiver for receiving satellite radio signals and/or a receiver for receiving internet radio signals.

The wireless communication device 312 operates to communicate with other devices using wireless data signals. The wireless communication device 312 can include one or more of a Bluetooth transceiver and a Wi-Fi transceiver. The wireless data signal may comprise a media content signal such as an audio or video signal. In some embodiments, the wireless communication device 312 is used to enable the vehicle media playback system 114 to wirelessly communicate with the PMSA system 110 and receive the media content signal 164 (FIG. 2) from the PMSA system 110 via an in-vehicle wireless network. The in-vehicle wireless network between the PMSA system 110 and the vehicle media playback system 114 can be configured similarly to the in-vehicle wireless data communication 122 (FIG. 2).

The wired input device 314 provides an interface configured to receive a cable for providing media content and/or commands. The wired input device 314 includes an input connector 340 configured to receive a plug extending from a media playback device for transmitting a signal for media content. In some embodiments, the wired input device 314 can include an auxiliary input jack (AUX) for receiving a plug from a media playback device that transmits analog audio signals. The wired input device 314 can also include different or multiple input jacks for receiving plugs from media playback devices that transmit other types of analog or digital signals (e.g., USB, HDMI, Composite Video, YPbPr, and DVI). In some embodiments, the wired input device 314 is also used to receive instructions from other devices.

In some embodiments, the wired input device 314 provides the input connector 340 (e.g., an AUX port) for receiving a connector 552 extending from the PMSA system 110, as illustrated in FIG. 6. The media content signal 164 is then transmitted from the PMSA system 110 to the vehicle media playback system 114 via the cable 550, the connector 552, and the input connector 340.

The processing device 316 operates to control various devices, components, and elements of the vehicle media playback system 114. The processing device 316 can be configured similar to the processing device 148 (FIG. 2) and, therefore, the description of the processing device 316 is omitted for brevity purposes.

In some embodiments, the processing device 316 operates to process the media content signal 164 received from the PMSA system 110 and convert the signal 164 to a format readable by the vehicle media playback system 114 for playback.

The memory device 318 is configured to store data and instructions that are usable to control various devices, components, and elements of the vehicle media playback system 114. The memory device 318 can be configured similar to the memory device 150 (FIG. 2) and, therefore, the description of the memory device 318 is omitted for brevity purposes.

The user input assembly 320 includes one or more input devices for receiving user input from users for controlling the vehicle media playback system 114. In some embodiments, the user input assembly 320 includes multiple knobs, buttons, and other types of input controls for adjusting volume, selecting sources and content, and adjusting various output parameters. In some embodiments, the various input devices are disposed on or near a front surface of the vehicle head unit 302. The various input devices can also be disposed on the steering wheel of the vehicle or elsewhere. Additionally or alternatively, the user input assembly 320 can include one or more touch sensitive surfaces, which can be incorporated in the display device 322.

The display device 322 displays information. In some embodiments, the display device 322 includes a liquid crystal display (LCD) panel for displaying textual information about content and/or settings of the vehicle media playback system 114. The display device 322 can also include other types of display panels such as a light emitting diode (LED) panel. In some embodiments, the display device 322 can also display image or video content.

The stored media interface assembly 324 reads media content stored on a physical medium. In some embodiments, the stored media interface assembly 324 comprises one or more devices for reading media content from a physical medium such as a compact disc or cassette tape.

The amplifier 304 operates to amplify a signal received from the vehicle head unit 302 and transmits the amplified signal to the speaker 306. In this manner, the media output 124 can be played back at a greater volume. The amplifier 304 may include a power source to power the amplification.

The speaker 306 operates to produce an audio output (e.g., the media output 124) based on an electronic signal. The speaker 306 can include one or more vehicle embedded speakers 330 disposed at various locations within the vehicle 80. In some embodiments, separate signals are received for at least some of the speakers (e.g., to provide stereo or surround sound).

In other embodiments, the speaker 306 can include one or more external speakers 332 which are arranged within the vehicle 80. Users may bring one or more external speakers 332 into the vehicle 80 and connect the external speakers 332 to the vehicle head unit 302 using a wired interface or a wireless interface. In some embodiments, the external speakers 332 can be connected to the vehicle head unit 302 using Bluetooth. Other wireless protocols can be used to connect the external speakers 332 to the vehicle head unit 302. In other embodiments, a wired connection (e.g., a cable) can be used to connect the external speakers 332 to the vehicle head unit 302. Examples of the wired connection include an analog or digital audio cable connection and a universal serial bus (USB) cable connection. The external speaker 332 can also include a mechanical apparatus for attachment to a structure of the vehicle.

Figure 5:
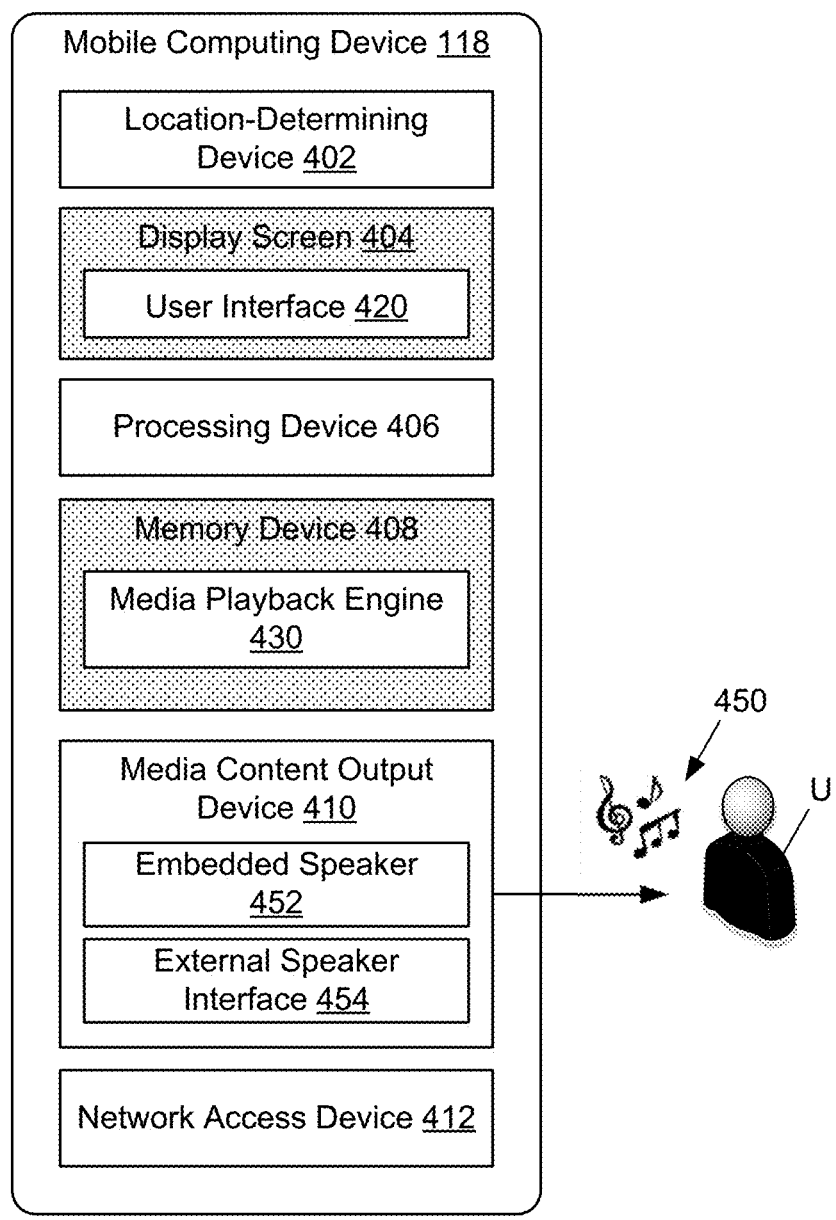
FIG. 5 is a block diagram of an example embodiment of a mobile computing device.

FIG. 5 is a block diagram of an example embodiment of the mobile computing device 118 of FIG. 1.

Similar to the PMSA system 110, the mobile computing device 118 can also be used to play media content. For example, the mobile computing device 118 is configured to play media content that is provided (e.g., streamed or transmitted) by a system external to the mobile computing device 118, such as the media delivery system 112, another system, or a peer device. In other examples, the mobile computing device 118 operates to play media content stored locally on the mobile computing device 118. In yet other examples, the mobile computing device 118 operates to play media content that is stored locally as well as media content provided by other systems.

In some embodiments, the mobile computing device 118 is a handheld or portable entertainment device, smartphone, tablet, watch, wearable device, or any other type of computing device capable of playing media content. In other embodiments, the mobile computing device 118 is a laptop computer, desktop computer, television, gaming console, set-top box, network appliance, blue-ray or DVD player, media player, stereo, or radio.

As described herein, the mobile computing device 118 is distinguished from the PMSA system 110 in various aspects. For example, unlike the PMSA system 110, the mobile computing device 118 is not limited to playing media content, but configured for a wide range of functionalities in various situations and places. The mobile computing device 118 is capable of running a plurality of different software applications for different purposes. The mobile computing device 118 enables the user to freely start or stop activation of such individual software applications.

In at least some embodiments, the mobile computing device 118 includes a location-determining device 402, a display screen 404, a processing device 406, a memory device 408, a media content output device 410, and a network access device 412. Other embodiments may include additional, different, or fewer components. For example, some embodiments may include a recording device such as a microphone or camera that operates to record audio or video content.

The location-determining device 402 is a device that determines the location of the mobile computing device 118. In some embodiments, the location-determining device 402 uses one or more of Global Positioning System (GPS) technology (which may receive GPS signals), Global Navigation Satellite System (GLONASS), cellular triangulation technology, network-based location identification technology, Wi-Fi positioning systems technology, and combinations thereof.

The display screen 404 is configured to display information. In addition, the display screen 404 is configured as a touch sensitive display and includes a user interface 420 for receiving a user input from a selector (e.g., a finger, stylus etc.) controlled by the user U. In some embodiments, therefore, the display screen 404 operates as both a display device and a user input device. The touch sensitive display screen 404 operates to detect inputs based on one or both of touches and near-touches. In some embodiments, the display screen 404 displays a graphical user interface for interacting with the mobile computing device 118. Other embodiments of the display screen 404 do not include a touch sensitive display screen. Some embodiments include a display device and one or more separate user interface devices. Further, some embodiments do not include a display device.

In some embodiments, the processing device 406 comprises one or more central processing units (CPU). In other embodiments, the processing device 406 additionally or alternatively includes one or more digital signal processors, field-programmable gate arrays, or other electronic circuits.

The memory device 408 operates to store data and instructions. In some embodiments, the memory device 408 stores instructions for a media playback engine 430. The memory device 408 may be configured similarly to the memory device 150 (FIG. 2) and, therefore, the description of the memory device 408 is omitted for brevity purposes.

The media playback engine 430 operates to play media content to the user U. As described herein, the media playback engine 430 is configured to communicate with the media delivery system 112 to receive one or more media content items (e.g., through the stream media 232). In other embodiments, the media playback engine 430 is configured to play media content that is locally stored in the mobile computing device 118.

In some embodiments, the media playback engine 430 operates to retrieve one or more media content items that are either locally stored in the mobile computing device 118 or remotely stored in the media delivery system 112. In some embodiments, the media playback engine 430 is configured to send a request to the media delivery system 112 for media content items and receive information about such media content items for playback.

Referring still to FIG. 5, the media content output device 410 operates to output media content. In some embodiments, the media content output device 410 generates media output 450 for the user U. In some embodiments, the media content output device 410 includes one or more embedded speakers 452 which are incorporated in the mobile computing device 118. Therefore, the mobile computing device 118 can be used as a standalone device that generates the media output 450.

In addition, some embodiments of the mobile computing device 118 include an external speaker interface 454 as an alternative output of media content. The external speaker interface 454 is configured to connect the mobile computing device 118 to another system having one or more speakers, such as headphones, portal speaker assemblies, and the vehicle media playback system 114, so that the media output 450 is generated via the speakers of the other system external to the mobile computing device 118. Examples of the external speaker interface 454 include an audio output jack, a Bluetooth transmitter, a display panel, and a video output jack. Other embodiments are possible as well. For example, the external speaker interface 454 is configured to transmit a signal through the audio output jack or Bluetooth transmitter that can be used to reproduce an audio signal by a connected or paired device such as headphones or a speaker.

The network access device 412 operates to communicate with other computing devices over one or more networks, such as the network 116 and the in-vehicle wireless data communication 122. Examples of the network access device 412 include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

FIG. 6 schematically illustrates an example embodiment of the PMSA system 110 of FIG. 1. In this example, the PMSA system 110 includes a personal media streaming appliance (PMSA) 500 and a docking device 502.

As described herein, the PMSA system 110 is sized to be relatively small so that the PMSA system 110 can be easily mounted to a structure (e.g., a dashboard or head unit) of the vehicle 80 where the user can conveniently manipulate the PMSA system 110. By way of example, the PMSA system 110 is configured to be smaller than a typical mobile computing device, such as a smartphone. Further, the PMSA 500 provides a simplified user interface for controlling playback of media content. For example, the PMSA 500 has a limited set of physical control elements, such as a single rotary knob and one or more physical buttons as described below, so that the user can easily control the PMSA system 110 in the vehicle 80 (FIG. 1).

The PMSA 500 is configured to include at least some of the devices of the PMSA system 110 as illustrated with reference to FIG. 2. In some embodiments, the PMSA 500 includes all of the devices of the PMSA system 110 as illustrated in FIG. 2.

As illustrated also in FIG. 2, some embodiments of the PMSA 500 include the user input device 130 that includes the manual input device 160 and the sound detection device 162. Some embodiments of the manual input device 160 include a control knob assembly 510 and one or more physical button assemblies 512.

In some embodiments, the control knob assembly 510 is configured to be maneuverable in multiple ways. For example, the control knob assembly 510 provides a plurality of regions on a knob face 514 that are independently depressible upon receiving a user's pressing action against the knob face 514. In the illustrated example, the control knob assembly 510 has five regions 516A-E (collectively 516) (e.g., up, down, left, right, and middle) that are separately depressible. At least some of the regions 516 are configured to receive inputs of different user commands (e.g., requests or instructions).

In other embodiments, the control knob assembly 510 is configured to be manipulated in different ways, such as tilting in multiple directions or sliding in multiple directions.

In addition, the control knob assembly 510 is configured to be rotatable. For example, the user can hold the control knob assembly 510 and rotate with respect to a body 520 of the PMSA 500. The control knob assembly 510 can be rotatable in both directions 522 (e.g., clockwise and counterclockwise). In other embodiments, the control knob assembly 510 is configured to rotate in only one direction.

The control knob assembly 510 is used to receive user inputs for controlling playback of media content. In addition or alternatively, the control knob assembly 510 can be used to receive user inputs for other purposes or functions.

The physical button assemblies 512 are configured to be depressed upon receiving a user's pressing action against the physical button assemblies 512. In the illustrated example, the PMSA 500 has four physical button assemblies 512A-512D (collectively 512). In some embodiments, each of the physical button assemblies 512 is configured to receive a single user command. In other embodiments, at least one of the physical button assemblies 512 is configured to receive multiple user commands.

In some embodiments, the physical button assemblies 512 are used as button assemblies that are preset to be associated with particular media content, thereby facilitating playback of such media content. In these embodiments, the physical button assemblies 512 are also referred to as preset button assemblies 512.

In some embodiments, the preset buttons 512 are configured to receive the manual input 154 to play media content that are preset to the respective preset buttons 512. In some embodiments, the preset button assemblies 512 are arranged at the front side of the body 520. In the illustrated example, four preset buttons 512A, 512B, 512C, and 512D (collectively 512) are provided at the front side of the body 520.

The preset buttons 512 can be distinguished from each other in various methods. In the illustrated example, different numbers of dots are used to indicate different preset buttons 512. For example, the preset buttons 512A, 512B, 512C, and 512D are provided with one dots, two dots, three dots, and four dots, respectively. The dots can be configured with at least partially tubes that can protrude above the surface of the front side to provide tactile sensation when touched or pressed by a user. The dots can be made of at least transparent material and lit by one or more light sources from the inside of the body 520. In other embodiments, different elements, such as symbols, characters, signs, printed elements or structures, or indicia can be used to differentiate the preset buttons 512. In some embodiments, such elements can be configured to emit light. By way of example, such elements can be at least partially made of self-luminous material. Such illumination of light can be configured to occur when the environment becomes dark.

In some embodiments, the preset buttons 512 can be actuated by a pressing action against the preset buttons 512. For example, the preset buttons 512 are configured to be depressed when a user presses the preset buttons 512 against the surface of the front side of the body 520, and the preset buttons 512 operate to detect the depression thereof.

In some embodiments, each of the preset buttons 512 is configured to receive a single user command. For example, the preset button assemblies 512 are configured such that a single pressing action against each of them corresponds to a single input. In other embodiments, at least one of the preset buttons 512 is configured to receive multiple user commands. For example, different pressing actions (e.g., a set of pressing and releasing, a set of pressing and holding for a predetermined period of time, a set of multiple pressings for a predetermined of time, etc.) can correspond to different user inputs.

In other embodiments, the physical buttons 512 can be used for non-content related actions. By way of example, the physical buttons 512 can be used for playback control actions, such as playback mode (e.g., shuffle, repeat, normal, etc.), playback speed (e.g., normal, slower, faster, etc.), crossfade (e.g., crossfade length), equalizer settings, audio normalization, and other possible settings relating to media content playback. Further, the physical buttons 512 can be used to connect the PMSA system 110 with other devices, such as the computing device 118.

It should be understood that physical buttons 512 can be any known or future developed component that is used to provide an activation signal to a processing device. For example physical buttons 512 can be mechanical button switches, conductive button switches, or capacitive button switches.

Although the present disclosure is primarily described herein with reference to physical preset buttons of the media playback device 104, such as the PMSA system 110, it is understood that the present disclosure is similarly applicable for other types of presets in the media playback device 104, such as presets that are voice-controlled without physical buttons. For example, the presets associated with the physical preset buttons 512 can be also activated by a voice command. By way of example, the PMSA system 110 receives a voice command from a user that requests for media content associated with a preset button 512, and the voice command (e.g., an utterance) is analyzed to identify the user request. Such analysis can be performed either locally in the PMSA system 110 or in the backend server (e.g., the media delivery system 112), or both. Then, the media delivery system 112 can determine media content associated with the preset button 512 and transmit a signal representative of the media content to the PMSA system 110 for playback.

In other embodiments, in addition to, or alternative to, the physical preset buttons 512, voice-only presets can be provided for the PMSA system 110. Such voice-only presets can be created and stored in the PMSA system 110 locally and/or in the backend server, and be operated only by a voice command. In some embodiments, the voice-only presets can be shared among different media playback devices associated with the same user account.

In addition, the PMSA 500 also includes the display screen 132. In some embodiments, the display screen 132 is arranged at the knob face 514 of the control knob assembly 510. As described herein, in some embodiments, the display screen 132 does not include a touch sensitive display screen, and is configured as a display device only. In other embodiments, however, the display screen 132 can be configured to be touch sensitive and receive a user input through the display screen 132 as well.

Referring still to FIG. 6, the docking device 502 is configured to mount the PMSA 500 to a structure of the vehicle 80. The docking device 502 is configured to removably mount the PMSA 500 thereto. The docking device 502 is further configured to attach to a structure of the vehicle 80 (FIG. 1) so that the PMSA 500 is positioned at the structure of the vehicle 80.

In some embodiments, an interface between the PMSA 500 and the docking device 502 is configured to prevent the PMSA 500 from rotating relative to the docking device 502 when the control knob assembly 510 is manipulated by a user. For example, the docking device 502 has a portion (e.g., a front portion of the docking device 502) configured to interlock a corresponding portion of the PMSA 500 (e.g., a rear portion of the PMSA 500) when the PMSA 500 is mounted to the docking device 502 such that the portion of the docking device 502 and the corresponding portion of the PMSA 500 form the interface therebetween.

In addition or alternatively, the PMSA 500 and the docking device 502 include magnetic materials at the interface therebetween so that the PMSA 500 and the docking device 502 are magnetically coupled to each other.

In some embodiments, the docking device 502 includes one or more electrical contacts 530 that are electrically connected to corresponding electrical contacts (not shown in FIG. 6) of the PMSA 500 when the PMSA 500 is mounted to the docking device 502. Such electrical connection between the PMSA 500 and the docking device 502 is provided for various functions.

In some embodiments, as described herein, the PMSA 500 does not include a battery sufficient for a prolonged use without an external power supply. In some embodiments, the PMSA 500 is primarily powered by a vehicle power supply 540. In some embodiments, the docking device 502 has a power receiving line 544 for connection to the vehicle power supply 540. For example, the power receiving line 544 extends from the docking device 502 and has a power connector 546 at a free end that is configured to mate with a vehicle power outlet 542 (e.g., a 12V auxiliary power outlet) of the vehicle power supply 540. As such, the docking device 502 receives electric power from the vehicle power supply 540 via the power receiving line 544, and the electrical connection between the PMSA 500 and the docking device 502 is configured to deliver electric power from the docking device 502 to the PMSA 500.

In some embodiments, as described herein, the PMSA 500 does not have a speaker and is designed to transmit media content signals to the vehicle media playback system 114 so that the media content is played through the vehicle media playback system 114. In some embodiments, the docking device 502 includes a media content output line 550 (also referred to herein as a media content output cable) (e.g., an auxiliary (AUX) output) configured to connect with the vehicle media playback input connector 340 (e.g., an auxiliary (AUX) port) of the vehicle media playback system 114. The docking device 502 is configured to receive media content signals from the PMSA 500 via the electrical connection between the PMSA 500 and the docking device 502, and transmit the signals to the vehicle media playback system 114 via the media content output line 550. In the illustrated embodiment, the power receiving line 544 and the media content output line 550 are combined to be a single line extending from the docking device 502 until the power connector 546, and the media content output line 550 further extends (or branches out) from the power connector 546 and terminates at a media output connector 552. The media output connector 552 is configured to connect to the vehicle media playback input connector 340 of the vehicle media playback system 114. In other embodiments, the media content output line 550 and the power receiving line 544 extend separately from the docking device 502.

In other embodiments, one or more of the power receiving line 544 and the media content output line 550 are directly connected to, and extend from, the PMSA 500 so that electric power is directly supplied to the PMSA 500 without the docking device 502 involved, and that the media content is directly transmitted to the vehicle media playback system 114 without passing through the docking device 502.

In some embodiments, the electrical connection between the PMSA 500 and the docking device 502 can be used to detect connection between the PMSA 500 and the docking device 502.

Figure 7:
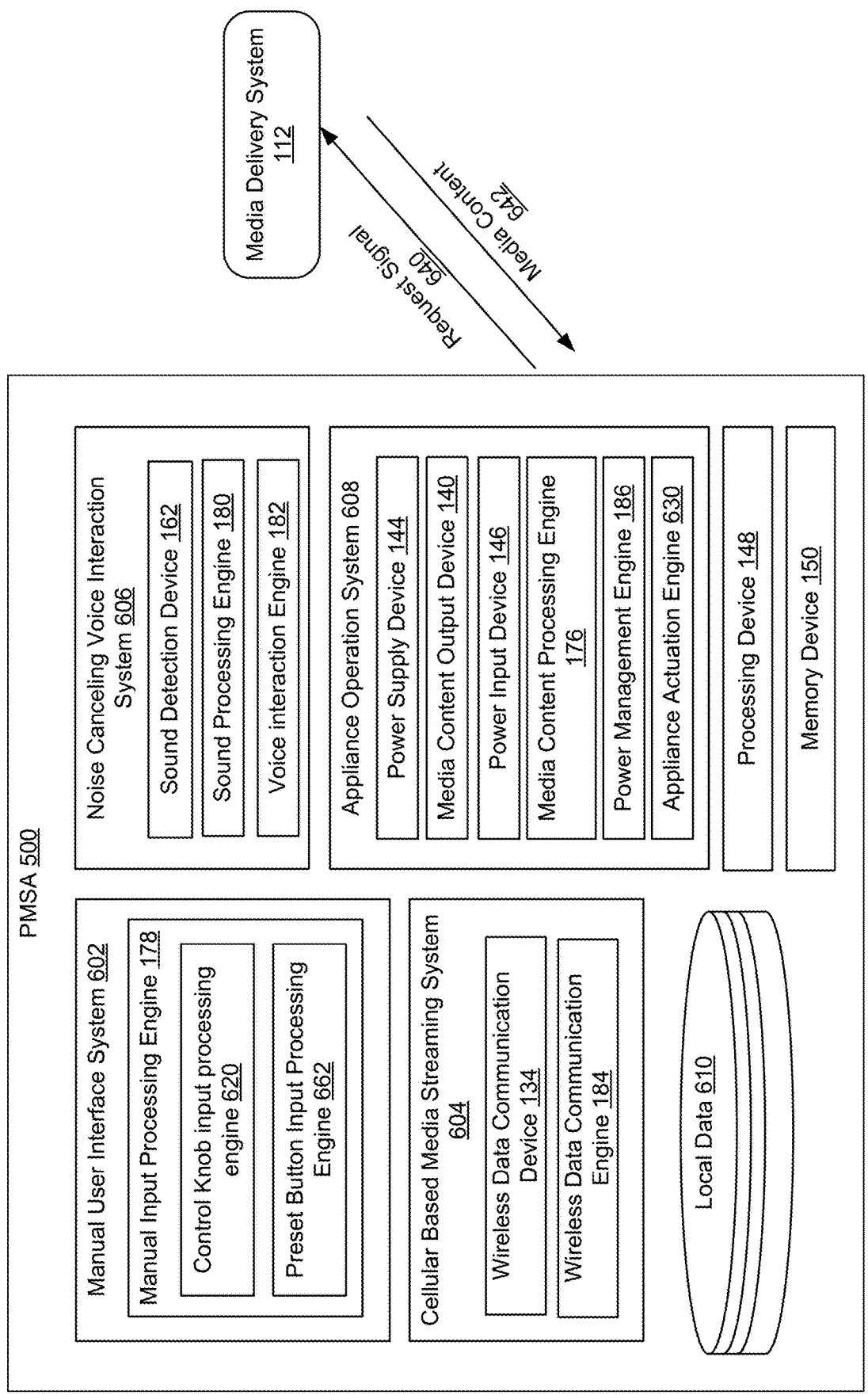
FIG. 7 is a block diagram of an example embodiment of a personal media steaming appliance (PMSA).

FIG. 7 is a block diagram of an example embodiment of the PMSA 500 of the PMSA system 110. In some embodiments, the PMSA 500 can include at least some of the devices of the PMSA system 110. Where same or similar devices are shown in this example, the same reference numbers will be used and the description of such same or similar devices is omitted or briefly provided for brevity purposes.

In some embodiments, the PMSA 500 can include the processing device 148 and the memory device 150 as described herein. In addition, the PMSA 500 can include a manual user interface system 602, a cellular-based media streaming system 604, a noise-cancelling voice interaction system 606, and an appliance operation system 608. In some embodiments, the PMSA 500 can include local data 610. In other embodiments, the PMSA 500 can include other devices or systems, such as at least one of the devices and the engines as illustrated and described with reference to FIG. 2.

The manual user interface system 602 is configured to receive manual user input for controlling playback of media content. In some embodiments, the manual user interface system 602 includes the rotatable manual control knob assembly 510 and a plurality of depressible preset button assemblies 512. The control knob assembly 510 and the preset button assemblies 512 are illustrated and described herein in more detail, such as with reference to FIG. 10.

In some embodiments, the manual user interface system 602 includes the manual input processing engine 178. As described herein, in some embodiments, the manual input processing engine 178 is included in the memory device 150 and configured to detect the manual user input and control playback of the media content based on the manual user input. In some embodiments, the manual input processing engine 178 includes a control knob input processing engine 620 and a preset button input processing engine 622.

The control knob input processing engine 620 operates to receive the manual input via the control knob assembly 510. In some embodiments, the control knob assembly 510 includes one or more sensors that detect manual inputs (e.g., press and rotation) and generate electric signals representative of the manual inputs when actuated. The control knob input processing engine 620 operates to process the electric signals and determine the user request (e.g., instruction or command) corresponding to the manual input.

The preset button input processing engine 622 operates to receive the manual input via at least one of the preset button assemblies 512. In some embodiments, the preset button assemblies 512 include one or more sensors that detect manual inputs (e.g., press) and generate electric signals representative of the manual inputs when actuated. The preset button input processing engine 622 operates to process the electric signals and determine the user request (e.g., instruction or command) corresponding to the manual input.

The cellular-based media streaming system 604 is configured to communicate with a media content provider (also referred to herein as a media streaming service provider or the like), such as the media delivery system 112, and receive media content from the media content provider via a cellular network. In some embodiments, the cellular-based media streaming system 604 includes the wireless data communication device 134. As described herein, the wireless data communication device 134 can be configured to communicate with the media content provider via a cellular network.

In some embodiments, the media content provider includes a media content source as shown in the media delivery system 112. In other embodiments, the media content provider can include other content service providers with other computing devices (e.g., servers), such as a news service provider, a weather service provider, or any other content sources.

In some embodiments, the cellular-based media streaming system 604 includes the wireless data communication engine 184. As described herein, in some embodiments, the wireless data communication engine 184 is included in the memory device 150 and configured to interact with the wireless data communication device 134 and enable the PMSA system 110 to communicate with the media content provider. In some embodiments, the wireless data communication engine 184 can transmit at least one of a device identifier and a user account identifier to the media content provider and receive media content associated with the at least one of the device identifier and the user account identifier from the media content provider at least partially via the cellular network. As described herein, the device identifier identifies the PMSA 500, and the user account identifier identifies the user account associated with the PMSA 500. The media content provider can operate to determine media content based on the device identifier and/or the user account identifier and transmit the media content to the PMSA 500 at least partially via the cellular network.

The noise-cancelling voice interaction system 606 is configured to provide voice assistant functions with noise-cancellation technology. In some embodiments, the noise-cancelling voice interaction system 606 includes the sound detection device 162 as described herein. For example, the noise-cancelling voice interaction system 606 includes at least one microphone configured to detect sounds in the vehicle.

In some embodiments, the noise-cancelling voice interaction system 606 includes the sound processing engine 180 and the voice interaction engine 182. As described herein, the sound processing engine 180 can operate to identify a voice input from the detected sounds in the vehicle. The voice interaction engine 182 can operate to cooperate with the media content provider to determine a command intended by the voice input.

The appliance operation system 608 is configured to manage operation of the PMSA 500. In some embodiments, the appliance operation system 608 includes at least one of the media content output device 140, the power supply device 144, and the power input device 146.

As described herein, the media content output device 140 (also referred to herein the media content output interface) is configured to enable the PMSA 500 to transmit media content to the vehicle media playback device 114. The media content output device 140 can be of various types, such as an auxiliary (AUX) output interface, a USB output interface, or a wireless output interface (e.g., Bluetooth, NFC, or Wi-Fi). As described herein, the power supply device 144 operates to store electric power to be used in the PMSA 500. The power input device 146 can be configured to be electrically connected to a power source of the vehicle and receive electric power from the vehicle.

In some embodiments, the appliance operation system 608 can include at least one of the media content processing engine 176, the power management engine 186, and an appliance activation engine 630. As described herein, the media content processing engine 176 can operate to process media content and generate a media content signal based on the media content. The media content processing engine 176 can transmit the media content signal to the vehicle media playback system 114 through the media content output device 140 so that the vehicle media playback system can use the media content signal to play the media content.

As described herein, the power management engine 186 is configured to charge the power supply device 144 (e.g., the battery with the electric power received from the power source of the vehicle through the power input device 146.

In some embodiments, the appliance activation engine 630 is configured to at least partially manage and operate at least one of the other engines of the PMSA 500. In some embodiments, the appliance activation engine 630 can be automatically activated by the processing device 148 upon powering up the PMSA 500, and the appliance activation engine 630 at least partially operates at least one of the other engines of the PMSA 500 upon activation.

In some embodiments, the appliance activation engine 630 can continue running until the PMSA 500 is powered off or down below a predetermined power level.

In some embodiments, the appliance activation engine 630 is provided by the media content provider (e.g., the media delivery system 114. In some embodiments, the PMSA 500 is free of user interface controls that would allow a user to disable operation of the appliance activation engine 630 on the PMSA 500. As such, the operation of the appliance activation engine 630 is not configurable or programmable by a user so that the PMSA 500 automatically starts and continues running until the PMSA 500 is powered off or down to a predetermined power level (e.g., sleep mode).

Referring still to FIG. 7, the PMSA 500 can include the local data 610. The local data 610 is stored locally in the PMSA 500. The local data 610 include data associated with the PMSA 500. An example of the local data 610 is illustrated and described in further detail herein, such as with reference to FIG. 8.

As described herein, the PMSA 500 can operate to receive the user input 152 from a user U for controlling the PMSA 500, such as the manual input 154 or the voice input 156. The PMSA 500 can operate to process the user input 152 and generate a request signal 640 based on the user input 152. The request signal 640 represents a user request intended by the user input 152. The PMSA 500 can transmit the request signal 640 to the media content provider, such as the media delivery system 112, so that the media content provider can perform a function intended by the user request based on the request signal 640. For example, the media content provider can determine media content 642 associated with the request signal 640 and transmit the media content 642 to the PMSA 500 for playback. An example of the request signal 640 is illustrated and described in further detail herein, such as with reference to FIG. 9.

In some embodiments, where the user input 152 is the manual input 154, the manual user interface system 602 can at least partially operate to generate the request signal 640. Where the user input 152 is the voice input 156, the noise-cancelling voice interaction system 606 can at least partially operate to generate the request signal 640. In some embodiments, the cellular-based media streaming system 604 can at least partially operate to transmit the request signal 640 to the media content provider.

Figure 8:
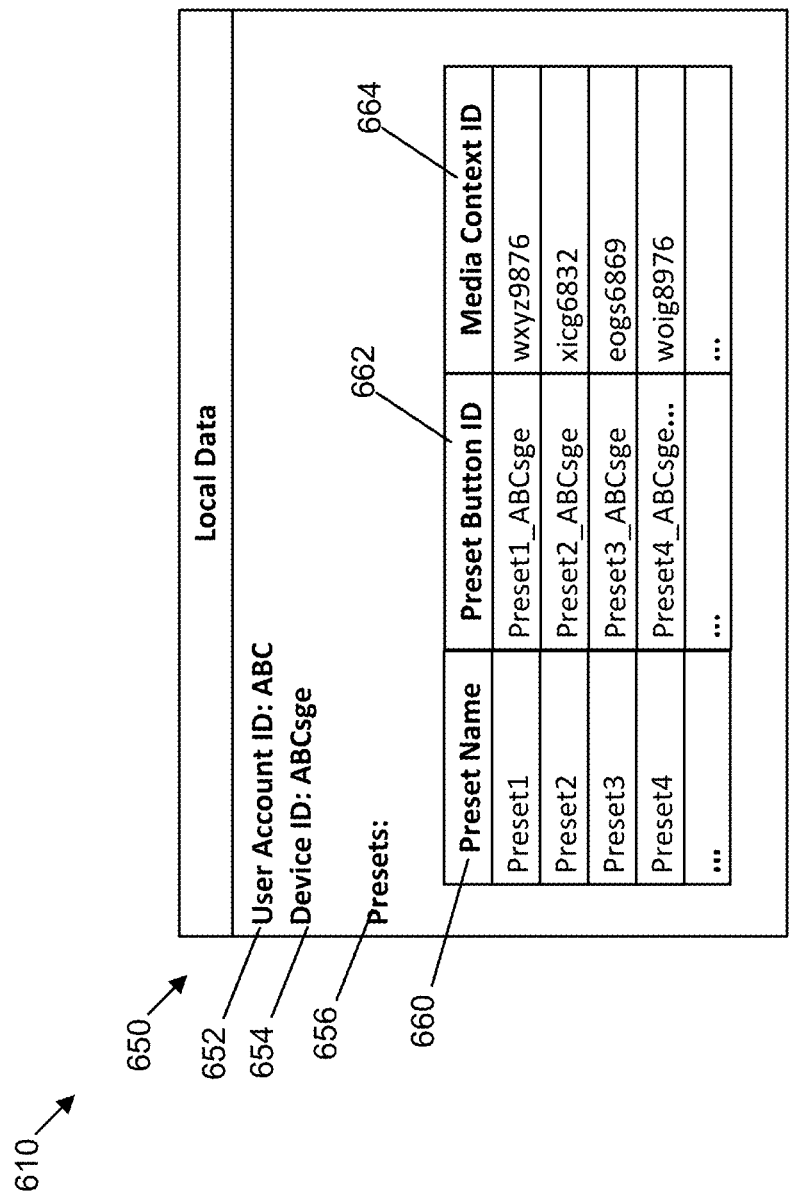
FIG. 8 illustrates an example data structure of local data.

FIG. 8 illustrates an example data structure 650 of the local data 610. As described above, the local data 610 can be stored in the PMSA system 110. In some embodiments, the local data 610 include a user account identifier 652, a device identifier 654, and preset button information 656. In other embodiments, the local data 610 can include other information, such as playback setting information (e.g., playback mode (shuffle, repeat, normal, etc.), playback speed, sound quality, etc.).

The user account identifier 652 is information that identifies a user account associated with the PMSA system 110. The device identifier 654 is information that identifies the PMSA system 110.

The preset button information 656 includes information about one or more preset buttons 512 of the PMSA system 110. In some embodiments, the preset button information 656 includes a preset name 660, a preset button identifier (ID) 662, and a media context identifier (ID) 664. The preset name 660 is a name of a preset button 512. The preset name 660 can be predetermined with a word or phrase (e.g., "Preset 1," "Preset 2," "Preset 3," and "Preset 4"). In other embodiments, the preset name 660 can be reset or renamed as desired by a user. The preset button identifier 662 is configured to identify an associated preset button 512. The media context identifier 664 is configured to identify a media context that is associated with a corresponding preset button 512. In some embodiments, the preset button identifier 662 and/or the media context identifier 664 are configured as Uniform Resource Identifiers (URIs).

Figure 9:
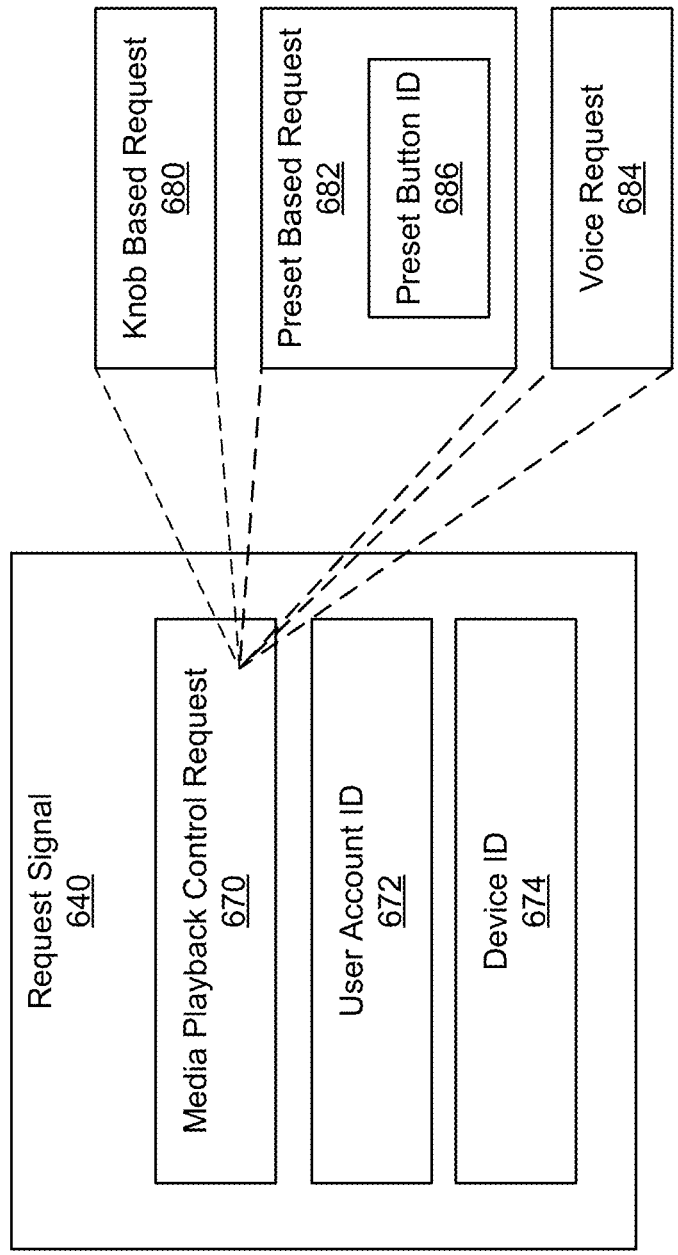
FIG. 9 illustrates an example request signal.

FIG. 9 illustrates an example of the request signal 640 of FIG. 7. In some embodiments, the request signal 640 conveys a media playback control request 670, a user account identifier 672, and a device identifier 674.

As described herein, the request signal 640 is transmitted from the PMSA 500 to the media content provider, such as the media delivery system 112. The request signal 640 includes information that is usable by the media delivery system 112 to perform functions requested by the user input 152 via the PMSA 500. In some embodiments, the request signal 640 is generated based at least in part on the local data 610.

In some embodiment, the media playback control request 670 can include a request for controlling playback of media content (e.g., a media context 238), such as playing, stopping playback, changing playback settings, and other controlling associated with media content playback. In some embodiments, the media playback control request 670 can be at least one of a control knob based request 680, a preset based request 682, and a voice request 684.

The control knob based request 680 includes a request that is received via the control knob 514. As described herein, the PMSA 500 operates to receive the user manual input 154 (e.g., a pressing action or a rotating action) via the control knob 514 and process the user manual input 154 to determine the request intended by the user input.

The preset based request 682 includes a request that is received via a preset button 512 of the PMSA 500. As described herein, the PMSA 500 operates to receive the user manual input 154 (e.g., a pressing action) via the preset button 512 and process the user manual input 154 to determine the request intended by the user input.

The voice request 684 includes a request that is received via the sound detection device 162 (e.g., one or more microphone) of the PMSA 500. As described herein, the PMSA 500 operates to the receive the voice input 156 via the sound detection device 162 and process the voice input 156 to determine the request intended by the user input.

The user account identifier (ID) 672 is information that identifies a user account associated with the PMSA 500 at which the media playback control request 670 is received. In some embodiments, the user account identifier 672 is retrieved from the local data 610 (e.g., the user account identifier 652).

The device identifier (ID) 674 is information that identifies the PMSA 500 at which the media playback control request 670 is received. In some embodiments, the device identifier 674 is retrieved from the local data 610 (e.g., the device identifier 654).

Where the preset based request 682 is involved, the request signal 640 can include a preset button identifier (ID) 686. The preset button identifier 686 is information that identifies the preset button 512 of the PMSA 500 via which the media playback control request 670 is received. In some embodiments, the preset button identifier 676 is retrieved from the local data 610 (e.g., the preset button identifier 662).

In alternative embodiments, the request signal 640 can further include other information usable by the media content provider. Examples of such other information include a preset name of the selected preset button, a media context identifier associated with the selected preset button, playback setting information, and any other suitable information associated with or stored in the PMSA 500.

Figure 12:
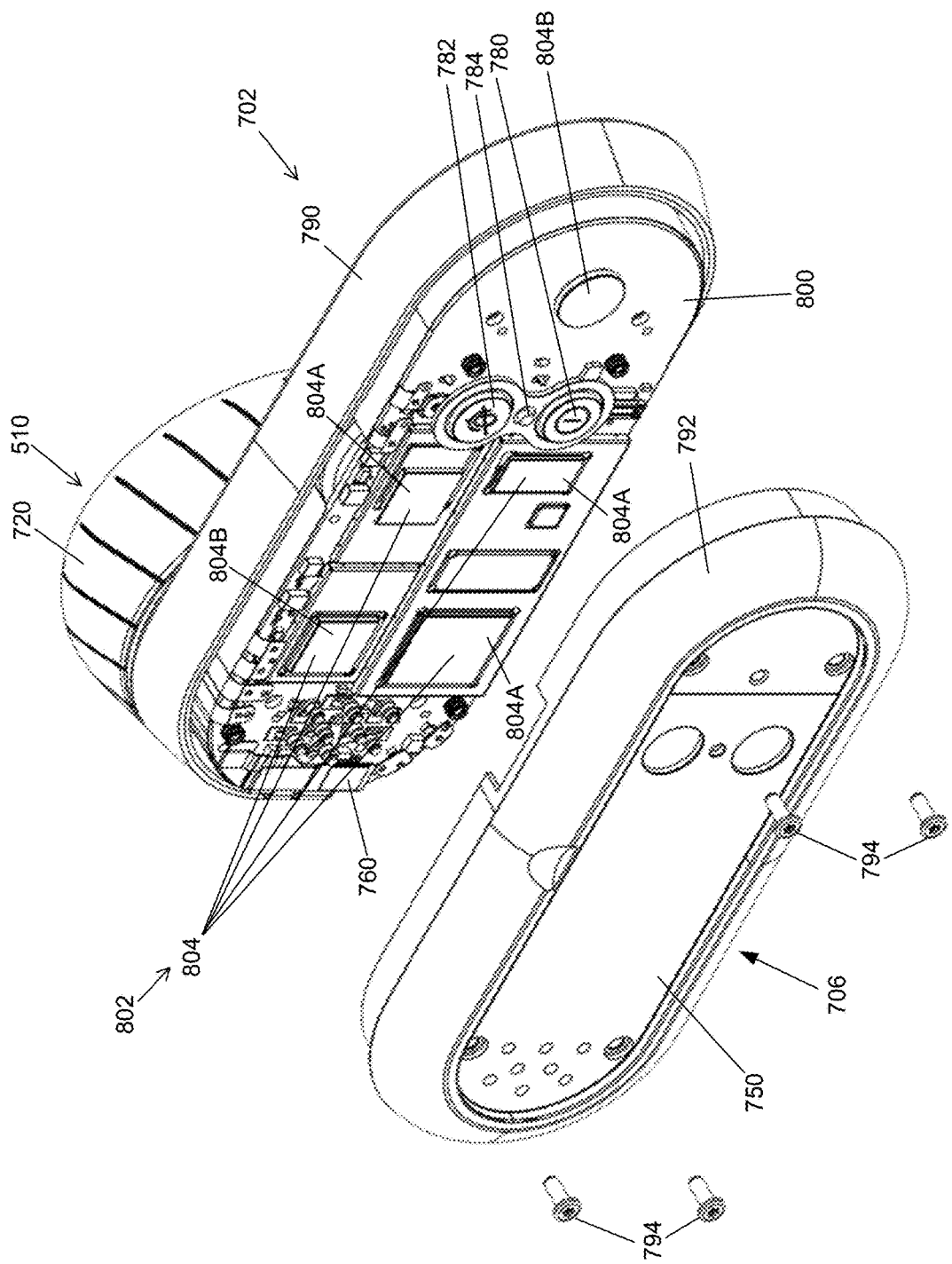
FIG. 12 is an exploded rear perspective view of the PMSA of FIG. 1.
Figure 13:
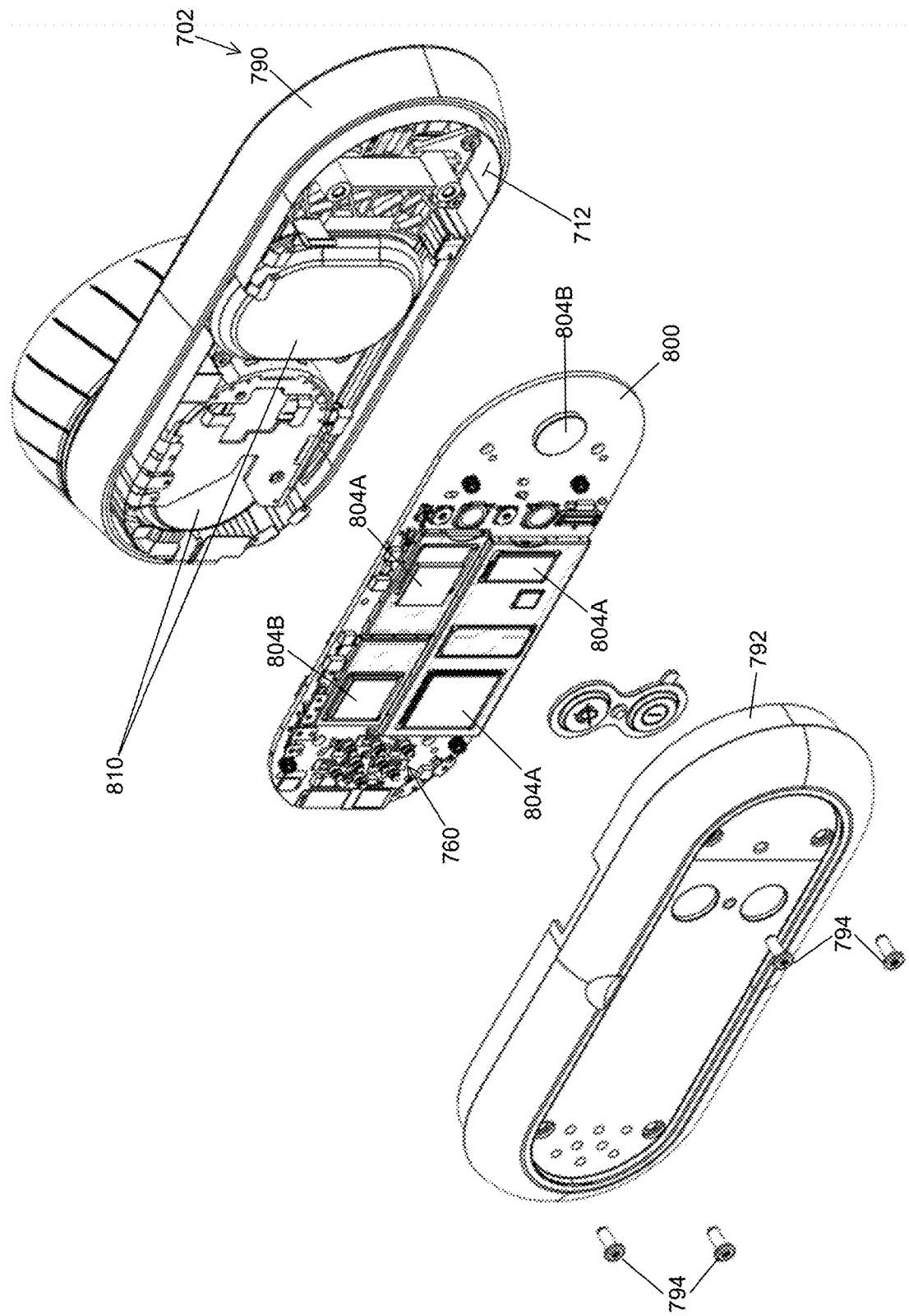
FIG. 13 is another exploded rear perspective view of the PMSA of FIG. 1.
Figure 14:
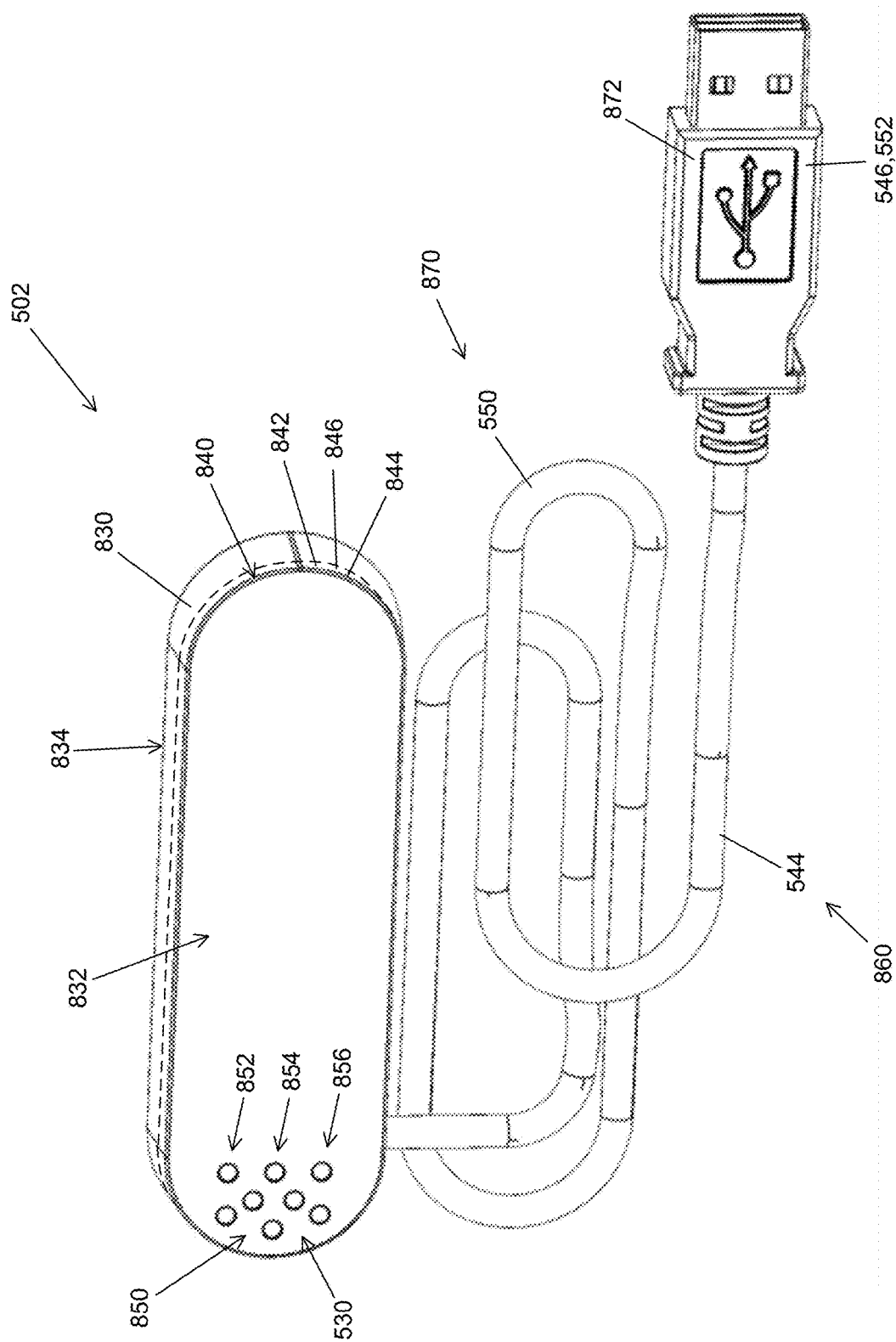
FIG. 14 is a front perspective view of an example docking device.
Figure 15:
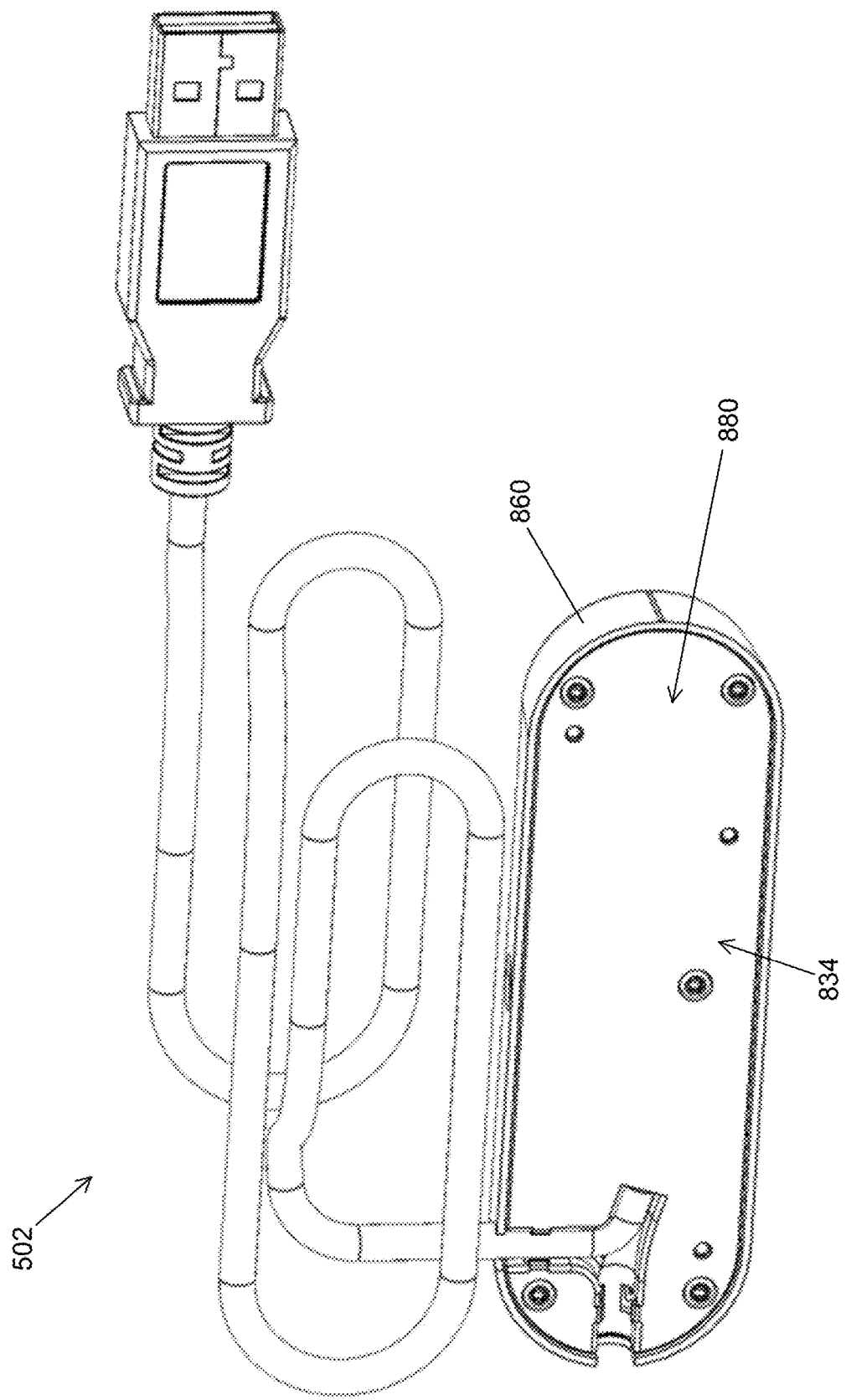
FIG. 15 is a rear perspective view of the docking device of FIG. 14.
Figure 16:
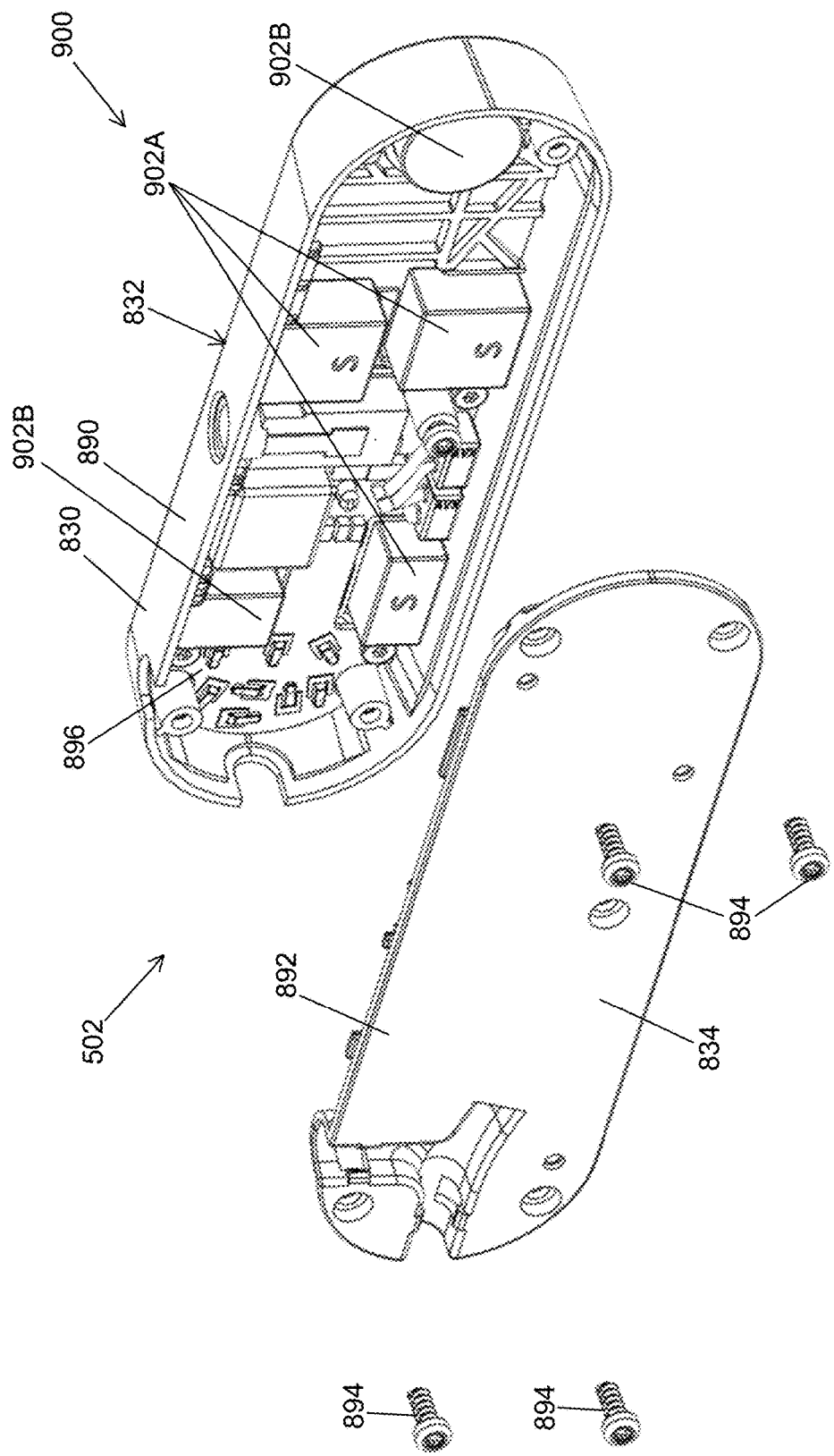
FIG. 16 is an exploded rear perspective view of the docking device of FIG. 14.

Referring to FIGS. 10-16, an example hardware structure of the PMSA system 110 is described. For example, FIGS. 10-13 illustrate an example of the PMSA 500, and FIGS. 14-16 illustrate an example of the docking device 502. At least some hardware features of the PMSA system 110 have been illustrated and described herein, such as with reference to FIGS. 2, 6, and 7. To the extent appropriate, the same reference numbers can be used and the description of such same or similar devices is omitted or briefly provided for brevity purposes.

Figure 10:
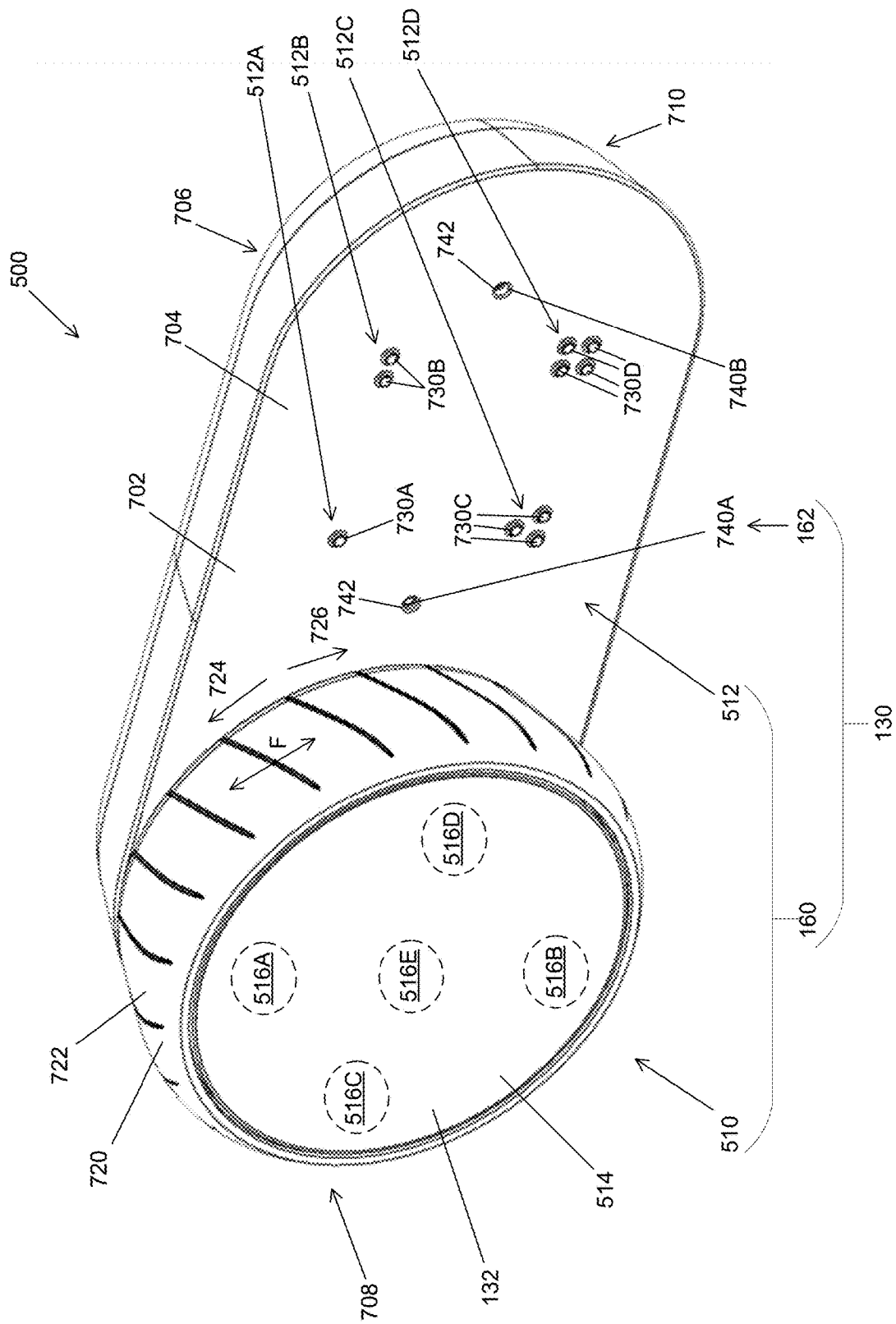
FIG. 10 is a front perspective view of an example embodiment of the PMSA.

FIG. 10 is a front perspective view of an example of the PMSA 500. In some embodiments, the PMSA 500 includes a body 702 having a front side 704 and a rear side 706 opposite to the front side 704. The body 702 has opposite lateral sides, such as a first lateral side 708 and an opposite second lateral side 710. The body 702 defines an interior space 712 (FIG. 13).

As described herein, the PMSA 500 includes the user input device 130, such as the manual input device 160 and the sound detection device 162. In some embodiments, the manual input device 160 includes a playback control assembly configured to control playback of media content. The manual input device 160 includes a control knob assembly 510 and one or more preset button assemblies 512.

The control knob assembly 510 is manually operable in a plurality of movements relative to the body 702. The plurality of movements correspond to a plurality of manual inputs. In some embodiments, the plurality of movements includes a rotational movement of at least a portion of the control knob assembly 510 relative to the body 702.

The control knob assembly 510 is arranged at the front side 704 of the body 702. In some embodiments, the control knob assembly 510 is disposed off the center of the front side 704 of the body 702 so that it is located to be biased toward either of the lateral sides 708 and 710. In this example, the control knob assembly 510 is arranged closer to the first lateral side 708 than to the second later side 710. Therefore, the center of the rotation of the control knob assembly 510 is spaced apart from the center of the body 702. The off-centered position of the control knob assembly 510 can prevent the body 702 of the PMSA 500 from rotating together with the control knob assembly 510 when the user operates the control knob assembly 510 to rotate relative to the body 702. Further, the off-centered position of the control knob assembly 510 can allow the body 702 to be securely mounted to the docking device 502 while the user rotates the control knob assembly 510, at least partially because the rotation of the control knob assembly 510 does not cause a rotation of the body 702 around its own center.

In some embodiments, the control knob assembly 510 has the front face 514 and a rotary knob 720. The front face 514 and the rotary knob 720 can be used to receive the manual input 154 in various ways.

As described herein, the front face 514 is configured to be depressible in multiple ways upon receiving a pressing action against different regions of the front face 514. In some embodiments, the front face 514 has five input regions 516A, 516B, 516C, 516D, and 516E (collectively 516) that are separately depressible. Actuation of different input regions 516 can be associated with different functions so that, when different input regions 516 are depressed by the manual input 154, different functions are performed. Such different functions can be associated with controlling of media content playback, such as play, stop (including pause), fast forward, fast reverse, skip, change playback mode (e.g., shuffle, repeat, normal, etc.), and other playback controls. Other functions or commands can be associated with, and triggered by, at least one of the input regions 516.

The rotary knob 720 is configured to rotate by the manual input 154. In some embodiments, the rotary knob 720 provides a peripheral grip surface 722 that can be gripped by one or more fingers of the user. By way of example, the user can hold the rotary knob 720 by gripping the peripheral grip surface 722 with fingers, and rotate the rotary knob 720 relative to the body 702.

In some embodiments, the rotary knob 720 can rotate in a plurality of directions, such as a first rotational direction 724 and an opposite second rotational direction 726. In other embodiments, the rotary knob 720 is configured to rotate in only on direction. In some embodiments, the rotary knob 720 is configured to continue to rotate in at least one of the possible rotational directions, without returning to a predetermined position. In other embodiments, the rotary knob 720 is configured to return to a predetermined default (or original) position when the rotary knob 720 is released after being rotated by a rotating action of the user.

In some embodiments, the rotary knob 720 is rotatable in various ways for receiving various inputs. For example, different functions or commands can be associated with different manipulations of the rotary knob 720, such as different magnitudes of rotation of the rotary knob 720, different speeds of rotation of the rotary knob 720, different directions of rotation of the rotary knob 720, and/or any other rotational control skims.

In some embodiments, the front face 514 is independently operable from the rotary knob 720. For example, the front face 514 can be depressed while the rotary knob 720 remains stationary upon the pressing action against the front face 514. Similarly, the rotary knob 720 can rotate around the front face 514 while the front face 514 remains stationary. In other embodiments, the control knob assembly 510 can be configured such that the front face 514 and the rotary knob 720 can be depressed together upon receiving the pressing action against the front face 514. In yet other embodiments, the control knob assembly 510 can be configured to be depressed as a whole when the front face 514 is depressed.

In some embodiments, the control knob assembly 510 is configured to be controlled in different ways. For example, the control knob assembly 510 is configured to be tilted multiple sideways (e.g., up, down, left, and right). In other examples, the control knob assembly 510 is configured to slide multiple sideways (e.g., up, down, left, and right). In addition, the control knob assembly 510 can be depressed upon pressing at the center as described herein.

As described herein, in some embodiments, the PMSA 500 includes the display screen 132 that is arranged at the knob face 514 of the control knob assembly 510. In some embodiments, the display screen 132 can display information relating to media content playback. In other embodiments, the display screen 132 can display other pieces of information. In some embodiments, the display screen 132 is configured as a display device only and is not touch sensitive. In other embodiments, the display screen 132 can be configured to be touch sensitive and receive a user input through the display screen 132 as well.

Referring still to FIG. 10, as described herein, the preset button assemblies 512 are configured to receive the manual input 154 to play media content that are preset to the respective preset button assemblies 512.

In some embodiments, the preset button assemblies 512 are arranged at the front side 704 of the body 702. In the illustrated example, four preset button assemblies 512A, 512B, 512C, and 512D (collectively 512) are provided at the front side 704 of the body 702.

The preset button assemblies 512 can be distinguished from each other in various methods. In the illustrated example, different numbers of dots are used to indicate different preset button assemblies 512. For example, the preset button assemblies 512A, 512B, 512C, and 512D are provided with one dot 730A, two dots 730B, three dots 730C, and four dots 730D, respectively. The dots 730 (including 730A, 730B, 730C, and 730D) can be configured with at least partially tubes that can protrude above the surface of the front side 704 to provide tactile sensation when touched or pressed by a user. The dots can be made of at least transparent material and lit by one or more light sources from the inside of the body 702. In other embodiments, different symbols, signs, or indicia can be used to differentiate the preset button assemblies 512.

In some embodiments, the preset button assemblies 512 can be actuated by a pressing action against the physical button assemblies 512. For example, the preset button assemblies 512 are configured to be depressed when a user presses the preset button assemblies 512 against the surface of the front side 704, and the preset button assemblies 512 operate to detect the depression thereof.

In some embodiments, each of the physical button assemblies 512 is configured to receive a single user command. For example, the preset button assemblies 512 are configured such that a single pressing action against each of them corresponds to a single input. In other embodiments, at least one of the physical button assemblies 512 is configured to receive multiple user commands. For example, different pressing actions (e.g., a set of pressing and releasing, a set of pressing and holding for a predetermined period of time, a set of multiple pressings for a predetermined of time, etc.) can correspond to different user inputs.

Referring still to FIG. 10, as described herein, the sound detection device 162 operates to detect sounds in or adjacent the PMSA 500. The sound detection device 162 can detect the voice input 156. In some embodiments, the sound detection device 162 includes one or more acoustic sensors, such as microphones. In the illustrated example, two microphones 740A and 740B (collectively 740) are used for the sound detection device 162. In other embodiments, more than two microphones 740 can be used. In some embodiments, the microphones 740A and 740B are arranged at the front side 704 of the body 702. For example, the microphones 740 are disposed in the interior 712 of the body 702 adjacent (e.g., underneath) the front side 704 of the body 702. The body 702 can have two microphone holes 742 that are aligned with the microphones 740 within the body 702 so that the microphones 740 are at least partially exposed at the front side 704 of the body 702. In other embodiments, one or more microphones 740 can be arranged in other locations in the front side 704 and/or in other sides of the body 702.

Such multiple microphones 740 can be used to cancel noises from the received sounds so that a desired sound (e.g., the voice input 156) is clearly identified. In this example, two microphones 740 of the sound detection device 162 are arranged apart from each other in the body 702 such that ambient noise is effectively canceled from the voice input 156 when the sounds are detected by the microphones 740.

Figure 11:
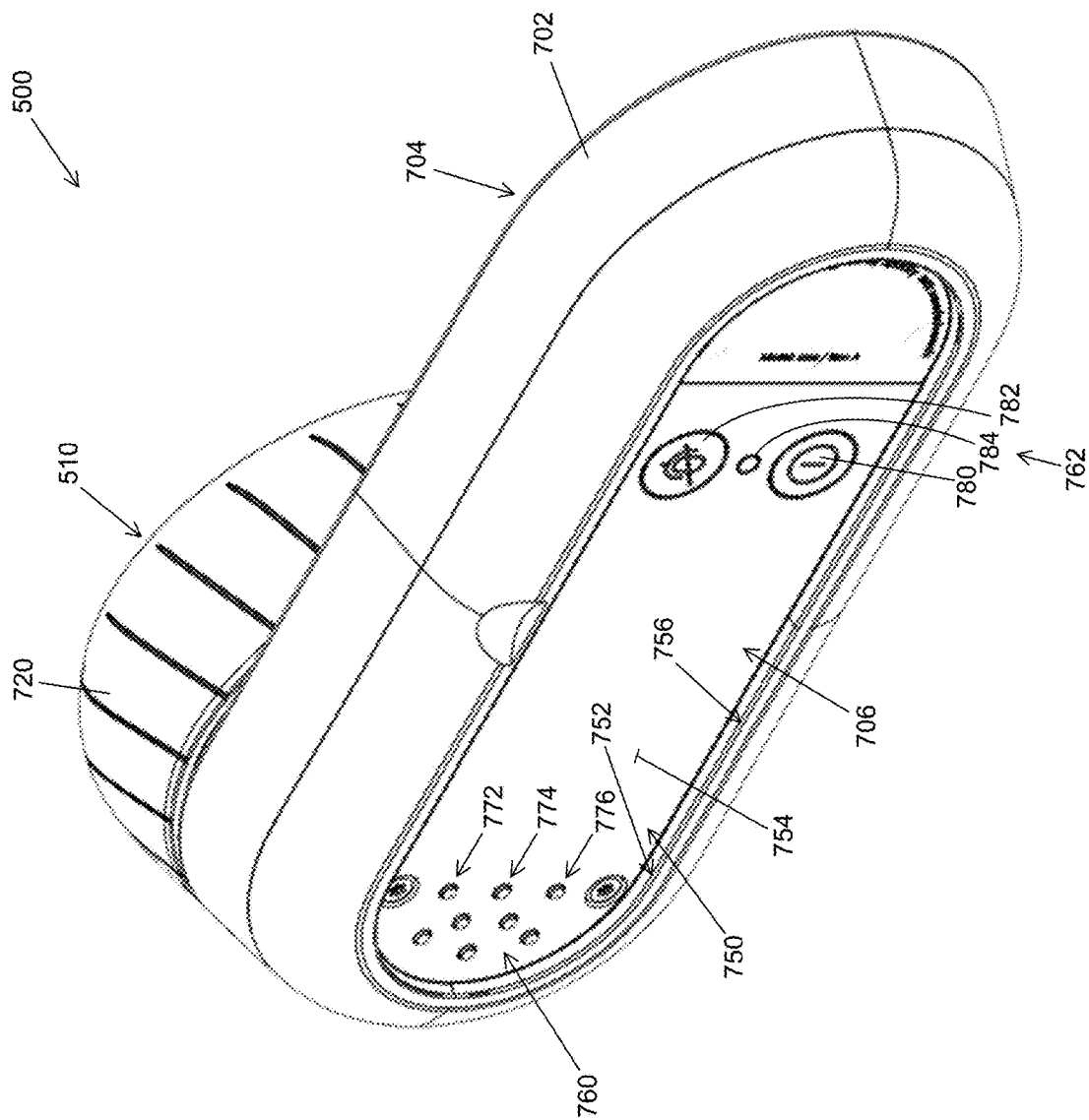
FIG. 11 is a rear perspective view of the PMSA of FIG. 10.

FIG. 11 is a rear perspective view of the PMSA 500 of FIG. 10. In some embodiments, the PMSA 500 includes a dock mounting structure 750, one or more appliance connectors 760, and one or more appliance control interfaces 762.

The dock mounting structure 750 can be arranged at the rear side 706 of the body 702. The dock mounting structure 750 is configured to engage the docking device 502 (e.g., an appliance coupling structure 840 of the docking device 502 in FIG. 14). An example engagement between the PMSA 500 and the docking device 502 is described in more detail herein, such as with reference to FIG. 14.

In some embodiments, the dock mounting structure 750 is configured to provide anti-rotation structure that prevents the PMSA 500 from disengaging from the docking device 502 or rotating relative to the docking device 502 when the control knob assembly 510 (e.g., the rotary knob 720 thereof) is rotated by the user's rotating manual input. In some embodiments, the dock mounting structure 750 is constructed to have a non-circular profile 752. In the illustrated example, the dock mounting structure 750 includes a recessed portion 754 provided on the rear side 706 of the body 702. The recessed portion 754 can be configured to have a periphery 756 that defines the non-circular profile 752. In the illustrated example, the non-circular profile 752 includes generally semi-circular recesses at opposite ends (i.e., at or adjacent the first and second lateral sides 708 and 710 of the body 702) and a generally rectangular recess that extends between the opposite semi-circular recesses. Other shapes are also possible for the non-circular profile 752, such as generally oval, elliptical, or polygonal shapes.

In some embodiments, the PMSA 500 includes the appliance connectors 760 configured to electrically connect to corresponding connectors of the docking device 502 and enable the PMSA 500 to interact with the docking device 502 for communicating data and/or electric power therebetween. The appliance connectors 760 can include a plurality of electrical contacts. In some embodiments, the appliance connectors 760 include spring-loaded pins, such as Pogo pins. In other embodiments, the appliance connectors 760 include electrical plates.

In some embodiments, the appliance connectors 760 are arranged in the dock mounting structure 750 so that, when the dock mounting structure 750 is mounted to the docking device 502, the appliance connectors 760 are aligned with, and electrically connected to, corresponding connectors of the docking device 502. In some embodiments, the appliance connectors 760 include a power input connector 772, a media signal output connector 774, and a docking identification connector 776.

The power input connector 772 is configured to electrically connect with a corresponding connector of the docking device 502 and receive electric power from the docking device 502. In some embodiments, the power input connector 772 includes a pair of electrical contacts for receiving electric power from the docking device 502 that can be connected to the power source of the vehicle. As described herein, the power input connector 772 can be used to charge one or more batteries in the PMSA 500 where the PMSA 500 includes such batteries.

The media signal output connector 774 is configured to electrically connect with a corresponding connector of the docking device 502 and transmit media content to the docking device 502. In some embodiments, the PMSA 500 transmits the media content signal 164 (FIG. 2) to the docking device 502 through the media signal output connector 774 so that the docking device 502 transmits the media content signal 164 to the vehicle media playback system 114 via, for example, the media content output line 550.

The docking identification connector 776 is configured to electrically connect with a corresponding connector of the docking device 502 and enables the PMSA 500 to determine that the PMSA 500 is mounted to the docking device 502 in place and electrically connected to the docking device 502 properly.

Referring still to FIG. 11, the PMSA 500 can further include the appliance control interfaces 762. In some embodiments, the appliance control interfaces 762 are arranged at the rear side 706 of the body 702. In other embodiments, the appliance control interfaces 762 are arranged in the dock mounting structure 750.

In some embodiments, the appliance control interfaces 762 include a power button 780, a microphone mute button 782, and a reset button 784. The power button 780 is configured to receive a user input (e.g., a press action) and turn on or off the PMSA 500 based on the user input. The microphone mute button 782 is configured to receive a user input (e.g., a press action) and turn on or off operation of the microphones 740 based on the user input. The reset button 784 is configured to receive a user input (e.g., a press action) and reset or format the PMSA 500 based on the user input.

FIG. 12 is an exploded rear perspective view of the PMSA 500 of FIG. 1. In some embodiments, the body 702 of the PMSA 500 includes a front body cover 790 and a rear body cover 792 that is coupled to the front body cover 790, thereby defining the interior space 712. In some embodiments, the front body cover 790 and the rear body cover 792 can be fastened to each other using one or more fasteners 794. In other embodiments, the front body cover 790 and the rear body cover 792 can be coupled in other methods, such as using adhesive.

The PMSA 500 includes at least one printed circuit board (PCB) 800 housed in the interior 712 of the body 702. The PCB 800 is configured to support and electrically connect electronic components and/or electrical components that implement the device, elements, components, and systems of the PMSA 500. For example, the PCB 800 is configured to include at least some of the devices of the PMSA 500 that are illustrated in FIGS. 2 and 7.

In some embodiments, the PMSA 500 includes an appliance magnetic attachment device 802 included in the interior space 712 of the body 702. The appliance magnetic attachment device 802 can be arranged adjacent (e.g., underneath) the rear side 706 of the body 702. The appliance magnetic attachment device 802 is configured to magnetically attract a corresponding magnetic device of the docking device 502 and thus cause the PMSA 500 to position and orient relative to the docking device 502 in a predetermined arrangement when the PMSA 500 is mounted to the docking device 502.

In some embodiments, the appliance magnetic attachment device 802 includes one or more plates 804 made of one or more magnetic materials. In some embodiments, the appliance magnetic attachment device 802 includes one or more first magnetic plates 804A with a polarity (e.g., north) and one or more second magnetic plates 804B with an opposite polarity (e.g., south). In this example, the PMSA 500 includes three magnetic plates 804A with "north" pole and two magnetic plates 804B with "south" pole.

In some embodiments, the appliance magnetic attachment device 802 is arranged in the dock mounting structure 750 (e.g., underneath the rear side 706 of the body 702 where the dock mounting structure 750 is located) so that the appliance magnetic attachment device 802 is used along with the dock mounting structure 750 of the PMSA 500.

FIG. 13 is another exploded rear perspective view of the PMSA 500 of FIG. 1. In FIG. 13, the PCB 800 is removed from an assembly received in the front body cover 790. In some embodiments, the PMSA 500 includes one or more batteries 810 (as the power supply device 144) included in the interior space 712 of the body 702. In this example, two batteries 810 are included in the interior space 712 of the body 702 and can be recharged and supply electric power to the PMSA 500.

FIG. 14 is a front perspective view of an example of the docking device 502. The docking device 502 can include a dock body 830 having a forward side 832 and a rearward side 834 opposite to the forward side 832. In some embodiments, the docking device 502 includes an appliance coupling structure 840, one or more dock connectors 850, a power source input device 860, and a media signal output device 870.

As described herein, the docking device 502 is used together with the PMSA 500. The docking device 502 is specifically designed to mount to a vehicle dashboard, a head unit, or other suitable locations of the vehicle. For example, the interface between the PMSA 500 and the docking device 502 is designed to prevent the PMSA 500 from rotating relative to the docking device 502 when the control elements (e.g., a rotary know and buttons) on the PMSA 500 are manipulated by a user. By way of example, the rear side of the PMSA 500 has a recess having a non-circular shape (e.g., hexagon, ellipse, etc.), and the front side of the docking device 502 is configured to have a corresponding non-circular shape, so that the front side of the docking device 502 is partially received into, and interlocked with, the rear side of the PMSA 500. In addition or alternatively, the PMSA 500 and the docking device 502 can include magnetic materials at the interface so that they are magnetically coupled.

Referring to FIG. 14, the appliance coupling structure 840 is configured to engage the dock mounting structure 750 of the PMSA 500. In some embodiments, the appliance coupling structure 840 is constructed to complementarily engage the non-circular profile 752 of the dock mounting structure 750 of the PMSA 500, thereby forming a mechanical interface 560 (FIG. 6) therebetween configured to resist a rotational force F (FIG. 10) applied by a user upon a rotation of the control knob assembly 510.

In some embodiments, the appliance coupling structure 840 includes a protruded portion 842 that forms on the forward side 832 of the dock body 830. The protruded portion 842 is can be formed integrally with the dock body 830. The protruded portion 842 is configured to engage the recessed portion 754 of the dock mounting structure 750. In some embodiments, the protruded portion 842 has a periphery 846 that defines a non-circular profile 844 therearound. The non-circular profile 844 of the protruded portion 842 is configured to be complementary to the non-circular profile 752 of the dock mounting structure 750 of the PMSA 500. For example, similar to the non-circular profile 752 of the dock mounting structure 750, the non-circular profile 844 of the docking device 502 includes generally semi-circular protrusions at opposite ends (i.e., at or adjacent opposite lateral sides of the dock body 830) and a generally rectangular protrusion that extends between the opposite semi-circular protrusions. Other shapes are also possible for the non-circular profile 844, such as generally oval, elliptical, or polygonal shapes.

In some embodiments, the docking device 502 includes one or more dock connectors 850. The dock connectors 850 are arranged to align with the appliance connectors 760 of the PMSA 500 and electrically connect with the appliance connectors 760 so that the PMSA 500 and the docking device 502 interact with each other to transmit data and/or electric power therebetween, when the PMSA 500 is mounted to the docking device 502.

The dock connectors 850 can include a plurality of electrical contacts 530. In some embodiments, the dock connectors 850 include electrical plates that contact the spring-loaded pins of the appliance connectors 760 of the PMSA 500. In other embodiments, the dock connectors 850 include spring-loaded pins, such as Pogo pins.

In some embodiments, the dock connectors 850 are arranged in the appliance coupling structure 840 so that, when the PMSA 500 is mounted to the docking device 502, the appliance coupling structure 840 of the docking device 502 engages with the dock mounting structure 750 of the PMSA 500, and the dock connectors 850 are aligned with, and electrically connected to, the corresponding appliance connectors 760 of the PMSA 500. In some embodiments, the dock connectors 850 includes a power output connector 852, a media signal input connector 854, and a docking identification connector 856.

The power output connector 852 is configured to be electrically connected to the power source input device 860 of the docking device 502 so that the docking device 502 receives electric power from the vehicle when the power source input device 860 is connected to the vehicle power supply 540 (FIG. 6) of the vehicle 80. The power output connector is arranged to electrically connect with the power input connector 772 of the PMSA 500 and configured to provide to the PMSA 500 the electric power that have been received from the vehicle 80.

The media signal input connector 854 is arranged to electrically connect with the media signal output connector 774 of the PMSA 500. The media signal input connector 854 is configured to receive media content (e.g., the media content signal 164 (FIG. 2)) from the PMSA 500 and transmit the media content to the vehicle media playback system 114 via the media signal output device 870.

The docking identification connector 856 is arranged to electrically connect with the docking identification connector 776 of the PMSA 500 and enable the PMSA 500 to determine that the PMSA 500 is properly mounted to the docking device 502.

Referring still to FIG. 14, the docking device 502 can further include the power source input device 860 and the media signal output device 870.

As described herein, the PMSA 500 can be primarily powered by an external power supply, such as from the vehicle 80. The power source input device 860 can be configured to be electrically connected to the power source of the vehicle, such as the vehicle power supply 540. The power source input device 860 is configured to receive the electric power from the vehicle 80 and transmit the electric power to the PMSA 500 via the power output connector 852 of the docking device 502 and the power input connector 772 of the PMSA 500 that are mated when.

In some embodiments, the power source input device 860 includes the power receiving line 544 and the power connector 546, as described with reference to FIG. 6. Various types of power connection can be used for the power connector 546, such as a vehicle power outlet (e.g., 12V power outlet) or a USB outlet (as illustrated in FIG. 14).

As illustrated herein, in some embodiments, the PMSA 500 is configured to transmit media content to the vehicle media playback system 114 so that the media content is played through the vehicle media playback system 114. The media signal output device 870 is configured to be connected to the vehicle media playback system 114. The media signal output device 870 is configured to receive media content from the PMSA 500 and transmit the media content to the vehicle media playback system 114 for playback. For example, the media content (e.g., the media content signal 164) is transmitted from the PMSA 500 to the docking device 502 via the media signal output connector 774 of the PMSA 500 and the media signal input connector 854 of the docking device 502 that are mated when the PMSA 500 is mounted to the docking device 502. The media content is then transmitted to the vehicle media playback system 114 via the media signal output device 870.

In some embodiments, the media signal output device 870 includes the media content output line 550 and the media output connector 552, as described with reference to FIG. 6. Various types of audio signal connection can be used for the media output connector 552, such as an auxiliary (AUX) outlet or a USB outlet (as illustrated in FIG. 14). Where a USB connection is used, the power source input device 860 and the media signal output device 870 are integrated as a single USB cable and connector 872 so that the transmission of electric power and media content signal can be performed via a single USB cable and connector 872.

FIG. 15 is a rear perspective view of the docking device 502 of FIG. 14. In some embodiments, the docking device 502 includes a vehicle mounting portion 880 configured to mount the docking device 502 to the vehicle 80. In some embodiments, the vehicle mounting portion 880 is arranged at the rearward side 834 and opposite to the appliance coupling structure 840.

The vehicle mounting portion 880 can be configured to securely attach to a structure of the vehicle 80 so that the docking device 502 remains attached to the structure of the vehicle 80 while the PMSA 500 can be repeatedly mounted to, and removed from, the docking device 502. In some embodiments, the vehicle mounting portion 880 that is arranged to be opposite to the appliance coupling structure 840 can help convenient and secured attachment and detachment of the PMSA 500 relative to the docking device 502.

The vehicle mounting portion 880 can be configured to attach to various locations of the vehicle 80, such as the dashboard 82, the head unit 84, a window (e.g., windshield, side windows, etc.), dashboard air vent, CD player slot, or other suitable structure in the vehicle. The vehicle mounting portion 880 can be configured to attach to the vehicle 80 in various methods. In some embodiments, the vehicle mounting portion 880 can be attached to a structure of the vehicle 80 with adhesive, such as a adhesive tape. In other embodiments, the vehicle mounting portion 880 can be attached to a structure of the vehicle 80 using a car mount of various types, such as a windshield mount, a dashboard mount, an air vent mount, a CD player slot mount, and other suitable types of car mount.

FIG. 16 is an exploded rear perspective view of the docking device 502 of FIG. 14. In some embodiments, the dock body 830 of the docking device 502 includes a front body cover 890 and a rear body cover 892 that is coupled to the front body cover 890. In some embodiments, the front body cover 890 and the rear body cover 892 can be fastened to each other using one or more fasteners 894. In other embodiments, the front body cover 890 and the rear body cover 892 can be coupled in other methods, such as using adhesive.

The docking device 502 includes at least one printed circuit board (PCB) 896 housed in of the dock body 830. The PCB 896 is configured to support and electrically connect electronic components and/or electrical components that implement the device, elements, components, and systems of the docking device 502.

In some embodiments, the docking device 502 includes a dock magnetic attachment device 900 included in the dock body 830. The dock magnetic attachment device 900 can be arranged adjacent (e.g., underneath) the forward side 832 of the dock body 830. The dock magnetic attachment device 900 is configured to interact with the appliance magnetic attachment device 802 of the PMSA 500 to removably mount the PMSA 500 to the docking device 502. The dock magnetic attachment device 900 is configured to magnetically attract the appliance magnetic attachment device 802 of the PMSA 500 and thus cause the PMSA 500 to position and orient relative to the docking device 502 in a predetermined arrangement when the PMSA 500 is mounted to the docking device 502.

In some embodiments, the dock magnetic attachment device 900 includes one or more magnets 902. In some embodiments, the dock magnetic attachment device 900 includes one or more first magnets 902A with a polarity (e.g., south) and one or more second magnets 902B with an opposite polarity (e.g., north). In this example, the docking device 502 includes three magnets 902A with "south" pole and two magnets 902B with "north" pole.

As illustrated, the magnets 902 are arranged to be generally aligned with the magnetic plates 804 of the PMSA 500 when the PMSA 500 is mounted to the docking device 502. For example, the first magnets 902A (e.g., south pole) are arranged to generally align with the first magnetic plates 804A of the PMSA 500 and magnetically attract the first magnetic plates 804A (e.g., north pole). Similarly, the second magnets 902B (e.g., north pole) are arranged to generally align with the second magnetic plates 804B of the PMSA 500 and magnetically attract the second magnetic plates 804B (e.g., south pole).

In some embodiments, the dock magnetic attachment device 900 is arranged in the appliance coupling structure 840 (e.g., underneath the forward side 832 of the dock body 830 where the appliance coupling structure 840 is located) so that the dock magnetic attachment device 900 is used along with the appliance coupling structure 840 of the docking device 502.

Although it is primarily described herein that the PMSA 500 includes magnetic plates and the docking device 502 includes magnets, it is possible in other embodiments that the PMSA 500 includes magnets while the docking device 502 includes magnetic plates, that both the PMSA 500 and the docking device 502 include magnets, or that both the PMSA 500 and the docking device 502 include magnetic plates.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A personal appliance system for streaming media content for playback by a vehicle media playback system of a vehicle, the system comprising:
    a docking device having an appliance coupling structure and a vehicle mounting portion, the vehicle mounting portion arranged opposite to the appliance coupling structure and configured to mount the docking device to the vehicle by securely attaching the docking device to a structure of the vehicle so that the docking device remains fixed to the structure of the vehicle when the personal appliance system is in use, the docking device further having a power source input device configured to electrically connect to a power source of the vehicle and receive electrical power from the vehicle to supply the electrical power to dock connectors positioned on a forward side the appliance coupling structure; and
    a personal media streaming appliance configured to removably engage and separate from the docking device, the personal media streaming appliance comprising:
        a body defining an interior space and having a front side and an opposite rear side;
        a dock mounting structure arranged on the rear side and configured to removably engage the appliance coupling structure of the docking device by forming a mechanical interface with the appliance coupling structure that resists forces applied to the body of the personal media streaming appliance when the personal appliance system is in use, and the dock mounting structure including appliance connectors configured to receive the electrical power from the dock connectors of the docking device;
        at least one processing device contained in the interior space of the body;
        at least one data storage device contained in the interior space of the body and storing data instructions executable by the at least one processing device;
        a manual user interface system configured to receive manual user input for controlling playback of media content, the user interface system including:
            a rotatable control knob assembly arranged at the front side of the body;
            a plurality of depressible preset button assemblies; and
            wherein the at least one data storage device includes a manual input processing engine configured to detect the manual user input and control playback of the media content based on the manual user input;
        a cellular-based media streaming system including:
            a wireless data communication device contained in the interior space of the body and configured to communicate with a media content provider via a cellular network;
        a noise-cancelling voice interaction system including:
            at least one microphone configured to detect sounds in the vehicle,
            wherein the at least one data storage device includes:
                a sound processing engine that operates to identify a voice input from the detected sounds in the vehicle; and
                a voice interaction engine that operates to cooperate with the media content provider to determine a command intended by the voice input; and an appliance operation system including:
a power input device configured to be electrically connected to the power source of the vehicle via the power source input device of the docking device and receive the electrical power from the vehicle; and
a media content output interface;
wherein the at least one data storage device includes:
a media content processing engine that operates to process the media content and generate and transmit through the media content output interface a media content signal that is usable by the vehicle media playback system for playback of the media content.

2. The personal appliance system of claim 1, wherein the cellular-based media streaming system further includes the at least one data storage device, the at least one data storage device including:
at least one of a device identifier and a user account identifier, the device identifier identifying the personal media streaming appliance, and the user account identifier identifying a user of the media content provider; and
a wireless data communication engine that operates to transmit at least one of the device identifier and the user account identifier to the media content provider and receive media content associated with the at least one of the device identifier and the user account identifier from the media content provider at least partially via the cellular network.

3. The personal appliance system of claim 1, wherein the appliance operation system further comprises an appliance activation engine that is automatically activated by the at least one processing device upon powering up the personal media streaming appliance, the appliance activation engine configured to at least partially operate at least one of the other engines upon activation.

4. The personal appliance system of claim 3, wherein the appliance activation engine continues running until the personal media streaming appliance is powered down below a predetermined power level.

5. The personal appliance system of claim 1, wherein the personal media streaming appliance is free of user interface controls that would allow a user to disable operation of the appliance activation engine on the personal media streaming appliance.

6. The personal appliance system of claim 1, wherein the appliance operation system further comprises:
a battery incorporated in the interior space of the body; and
a power management engine configured to charge the battery with the electrical power received from the power source of the vehicle through the power input device.

7. The personal appliance system of claim 1, wherein the media content provider includes a media content source.

8. The personal appliance system of claim 1, wherein the personal media streaming appliance further comprises:
a display device arranged on the control knob assembly and configured to display information relating to the playback of the media content.

9. The personal appliance system of claim 1, wherein the control knob assembly is manually operable in a plurality of movements relative to the body, the plurality of movements corresponding to a plurality of manual inputs.

10. The personal appliance system of claim 9, wherein the plurality of movements includes a rotational movement of at least a portion of the control knob assembly relative to the body.

11. The personal appliance system of claim 1, wherein the dock mounting structure of the personal media streaming appliance is constructed to have a non-circular profile.

12. The personal appliance system of claim 11, wherein the dock mounting structure of the personal media streaming appliance includes a recessed portion provided on the rear side of the body, the recessed portion having the non-circular profile.

13. The personal appliance system of claim 11, wherein the appliance coupling structure of the docking device is constructed to complementarily engage the non-circular profile of the dock mounting structure of the personal media streaming appliance, thereby forming the mechanical interface therebetween configured to resist a rotational force applied by a user upon a rotation of the control knob assembly.

14. The personal appliance system of claim 13, wherein the appliance coupling structure of the docking device includes a protruded portion, the protruded portion having a non-circular profile that is complementary to the recessed portion.

15. The personal appliance system of claim 1, wherein the docking device includes:
a media signal output device configured to be connected to the vehicle media playback system, the media signal output device configured to receive the media content from the personal media streaming appliance through the media content output interface and transmit the media content to the vehicle media playback system.

16. The personal appliance system of claim 15, wherein at least one of the power source input device and the media signal output device is configured with at least one of a USB cable and an auxiliary cable.

17. The personal appliance system of claim 1, wherein the dock mounting structure of the personal media streaming appliance includes:
an appliance magnetic attachment device included in the interior space of the body and arranged adjacent the rear side of the body.

18. The personal appliance system of claim 17, wherein the appliance magnetic attachment device includes one or more first magnetic plates with a polarity, and one or more second magnetic plates with an opposite polarity.

19. The personal appliance system of claim 17, wherein the docking device further includes:
a dock magnetic attachment device included in a dock body and configured to interact with the appliance magnetic attachment device to removably secure the appliance coupling portion to the dock coupling portion.

20. The personal appliance system of claim 19, wherein the dock magnetic attachment includes one or more first magnets and one or more second magnets, the first magnets configured to attract the first magnetic plates of the personal media streaming appliance, and the second magnets configured to attract the second magnetic plates of the personal media streaming appliance.

21. The personal appliance system of claim 1, wherein the appliance connectors include:
a power input connector configured to receive power from the docking device; and
a media signal output connector configured to transmit media content.

22. The personal appliance system of claim 21, wherein the plurality of dock connectors includes dock connectors include:
- a power output connector connected to the power source input device of the docking device, the power output connector arranged to connect with the power input connector of the appliance and configured to provide power to the appliance; and
- a media signal input connector arranged to connect with the media signal output connector of the appliance, and configured to receive the media content from the appliance and transmit the media content to the vehicle media playback system via the media signal output device.

23. The personal appliance system of claim 22, wherein:
the appliance connectors include a first docking status identification connector; and
the dock connectors include a second docking status identification connector arranged to connect with the first docking status identification connector to determine that the appliance is mounted to the docking device in a predetermined configuration.

24. A personal appliance system for streaming media content for playback by a vehicle media playback system of a vehicle, the system comprising:
- a docking device having an appliance coupling structure and a vehicle mounting portion, the vehicle mounting portion arranged opposite to the appliance coupling structure and configured to mount the docking device to the vehicle by securely attaching the docking device to a structure of the vehicle so that the docking device remains fixed to the structure of the vehicle when the personal appliance system is in use, the docking device further having a power source input device configured to electrically connect to a power source of the vehicle and receive electrical power from the vehicle to supply the electrical power to dock connectors positioned on a forward side the appliance coupling structure; and
- a personal media streaming appliance configured to removably engage and separate from the docking device, the personal media streaming appliance comprising:
  - a body defining an interior space and having a front side and an opposite rear side;
  - a dock mounting structure arranged on the rear side and configured to removably engage the appliance coupling structure of the docking device by forming a mechanical interface with the appliance coupling structure that resists forces applied to the body of the personal media streaming appliance when the personal appliance system is in use, and the dock mounting structure including appliance connectors configured to receive the electrical power from the dock connectors of the docking device;
  - at least one processing device contained in the interior space of the body;
  - at least one data storage device contained in the interior space of the body and storing data instructions executable by the at least one processing device;
  - a manual user interface system configured to receive manual user input for controlling playback of media content, the user interface system including:
    - a rotatable control knob assembly arranged at the front side of the body;
    - a plurality of depressible preset button assemblies; and wherein the at least one data storage device includes a manual input processing engine configured to detect the manual user input and control playback of the media content based on the manual user input;
  - a cellular-based media streaming system including:
    - a wireless data communication device contained in the interior space of the body and configured to communicate with a media content provider via a cellular network;
    - a power input device configured to be electrically connected to the power source of the vehicle via the power source input device of the docking device and receive electric the electrical power from the vehicle; and
    - a media content output interface;
  wherein the at least one data storage device includes:
    - a media content processing engine that operates to process the media content and generate and transmit through the media content output interface a media content signal that is usable by the vehicle media playback system for playback of the media content.

25. A personal appliance system for streaming media content for playback by a vehicle media playback system of a vehicle, the system comprising:
- a docking device having:
  - vehicle mounting portion configured to mount the docking device to the vehicle by securely attaching the docking device to a structure of the vehicle so that the docking device remains fixed to the structure of the vehicle when the personal appliance system is in use;
  - an appliance coupling structure arranged opposite the vehicle mounting portion, the appliance coupling structure having a protruded portion including dock connectors positioned on a forward side the appliance coupling structure; and
  - a power source input device configured to electrically connect to a power source of the vehicle and receive electrical power from the vehicle to supply the electrical power to the dock connectors of the appliance coupling structure; and
- a personal media streaming appliance configured to removably engage and separate from the docking device, the personal media streaming appliance comprising:
  - a body having a front side and an opposite rear side;
  - a dock mounting structure arranged on the rear side, the dock mounting structure having appliance connectors configured to receive the electrical power from the dock connectors of the docking device, and having a recessed portion configured to removably engage the appliance coupling structure of the docking device by forming a mechanical interface with the protruded portion of the appliance coupling structure that resists forces applied to the body of the personal media streaming appliance when the personal appliance system is in use;
  - at least one processing device contained inside the body;
  - at least one data storage device contained inside the body and storing data instructions executable by the at least one processing device;
  - a manual user interface system configured to receive manual user input for controlling playback of media content, the user interface system including:

a rotatable control knob assembly arranged at the front side of the body;

wherein the at least one data storage device includes a manual input processing engine configured to detect the manual user input and control playback of the media content based on the manual user input;

a cellular-based media streaming system including:

a wireless data communication device contained inside the body and configured to communicate with a media content provider via a cellular network; and a media content processing engine that operates to process the media content and transmit through a media content output interface a media content signal that is usable by the vehicle media playback system for playback of the media content.

\* \* \* \* \*